(12) United States Patent
Fish

(10) Patent No.: US 12,122,936 B2
(45) Date of Patent: *Oct. 22, 2024

(54) HIGH PERFORMANCE SILICON-BASED COATING COMPOSITIONS

(71) Applicant: Burning Bush Group, LLC, Kansas City, MO (US)

(72) Inventor: Chris Fish, Lee's Summit, MO (US)

(73) Assignee: Burning Bush Group LLC, Kansas City, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/451,446

(22) Filed: Aug. 17, 2023

(65) Prior Publication Data

US 2024/0043717 A1    Feb. 8, 2024

Related U.S. Application Data

(60) Division of application No. 15/395,642, filed on Dec. 30, 2016, now Pat. No. 11,773,290, which is a
(Continued)

(51) Int. Cl.
*C09D 183/16* (2006.01)
*B05D 3/00* (2006.01)
(Continued)

(52) U.S. Cl.
CPC .......... *C09D 183/16* (2013.01); *B05D 3/007* (2013.01); *C08L 83/16* (2013.01); *C09D 5/00* (2013.01);
(Continued)

(58) Field of Classification Search
CPC .......... B05D 3/007; B05D 5/08; C08G 77/04; C08G 77/60; C08G 77/62; C08L 83/00;
(Continued)

(56) References Cited

U.S. PATENT DOCUMENTS 2,411,938 A   12/1946 Ratner
2,859,137 A   11/1958 Ellis
(Continued)

FOREIGN PATENT DOCUMENTS

CN   1780889   5/2006
CN   101153078   4/2008
(Continued)

OTHER PUBLICATIONS

Birot, M. et al., "Comprehensive Chemistry of Polycarbosilanes, Polysilazanes, and Polycarbosilazanes as Precursors of Ceramics," Chemistry Reviews, 95:1443-1477 (1995).
(Continued)

*Primary Examiner* — Lawrence D Ferguson
(74) *Attorney, Agent, or Firm* — C A Schlecht; Midtown Intellectual Property, PC

(57) ABSTRACT

A silicon-based coating composition for a wide range of mold surfaces, which composition is formed from a mixture of constituents comprising appropriate portions of silazane, siloxane, and silane, and optionally organic solvent. The composition, after curing, results in an extreme release product that is non-transferable to the finished part, allowing for proper adhesion of coatings or adhesives to the finished surface without additional surface preparation. The cured coatings are ultrathin, having a thickness between 0.1 μm and 3 μm, and having a hardness between about 4H and about 9H.

12 Claims, 15 Drawing Sheets

Related U.S. Application Data continuation of application No. 13/935,443, filed on Jul. 3, 2013, now Pat. No. 9,567,488.

(60) Provisional application No. 61/667,559, filed on Jul. 3, 2012.

(51) Int. Cl.

| | | |
|---|---|---|
| *C08L 83/16* | (2006.01) | |
| *C09D 5/00* | (2006.01) | |
| *C09D 5/08* | (2006.01) | |
| *C09D 5/24* | (2006.01) | |
| *C09D 5/32* | (2006.01) | |
| *C09D 183/00* | (2006.01) | |
| *C09D 183/04* | (2006.01) | |
| *C09D 183/10* | (2006.01) | |
| *C09D 183/14* | (2006.01) | |
| *B05D 5/08* | (2006.01) | |
| *C08G 77/04* | (2006.01) | |
| *C08G 77/60* | (2006.01) | |
| *C08G 77/62* | (2006.01) | |

(52) U.S. Cl.
CPC ............... *C09D 5/08* (2013.01); *C09D 5/24* (2013.01); *C09D 5/32* (2013.01); *C09D 183/00* (2013.01); *C09D 183/04* (2013.01); *C09D 183/10* (2013.01); *C09D 183/14* (2013.01); *B05D 5/08* (2013.01); *C08G 77/04* (2013.01); *C08G 77/60* (2013.01); *C08G 77/62* (2013.01)

(58) Field of Classification Search
CPC ..... C08L 83/16; C09D 183/00; C09D 183/04; C09D 183/10; C09D 183/14; C09D 183/16; C09D 5/00; C09D 5/08; C09D 5/24; C09D 5/32
See application file for complete search history.

(56) References Cited

U.S. PATENT DOCUMENTS

| | | | |
|---|---|---|---|
| 3,419,514 A | 12/1968 | Hadlock | |
| 3,445,276 A | 5/1969 | Pikula | |
| 3,814,710 A * | 6/1974 | Duncan | C08L 83/04 528/33 |
| 4,288,356 A | 9/1981 | Huebner | |
| 4,298,559 A | 11/1981 | Baney | |
| 4,322,456 A | 3/1982 | Martin | |
| 4,349,609 A | 9/1982 | Takeda | |
| 4,386,117 A | 5/1983 | Gordon | |
| 4,417,042 A * | 11/1983 | Dziark | C08L 83/14 528/901 |
| 4,510,283 A | 4/1985 | Takeda | |
| 4,529,629 A | 7/1985 | Liu | |
| 4,562,091 A | 12/1985 | Sachdev | |
| 4,670,057 A | 6/1987 | Oezelli | |
| 4,685,930 A | 8/1987 | Kasprzak | |
| 4,686,135 A | 8/1987 | Obayashi | |
| 4,844,986 A | 7/1989 | Karakelle | |
| 4,886,860 A | 12/1989 | Arai | |
| 4,946,920 A | 8/1990 | Vaahs | |
| 5,043,789 A | 8/1991 | Linde | |
| 5,086,127 A | 2/1992 | Itoh | |
| 5,162,407 A | 11/1992 | Turner | |
| 5,364,920 A | 11/1994 | Bujalski | |
| 5,489,479 A | 2/1996 | Lucas | |
| 5,599,892 A | 2/1997 | Hayashida | |
| 5,605,958 A | 2/1997 | Yoneda | |
| 5,668,212 A | 9/1997 | Naito | |
| 5,907,019 A | 5/1999 | Itoh | |
| 5,919,572 A | 7/1999 | Blum | |
| 6,013,752 A | 1/2000 | Mowrer | |
| 6,255,373 B1 | 7/2001 | Akamatsu | |
| 6,329,487 B1 | 12/2001 | Abel | |
| 6,387,166 B1 | 5/2002 | Abele | |
| 6,534,184 B2 | 3/2003 | Knasiak | |
| 6,562,465 B1 | 5/2003 | Nakashima | |
| 6,646,039 B2 | 11/2003 | Li | |
| 6,706,798 B2 | 3/2004 | Kobayashi | |
| 6,734,250 B2 | 5/2004 | Azechi | |
| 6,756,469 B2 | 6/2004 | Lukacs, III | |
| 6,916,529 B2 | 7/2005 | Pabla | |
| 7,462,668 B2 | 12/2008 | Lu | |
| 7,476,970 B2 | 1/2009 | Ozaki | |
| 7,527,872 B2 | 5/2009 | Steele | |
| 7,566,500 B2 | 7/2009 | Kohama | |
| 7,687,150 B2 | 3/2010 | Simendinger, III | |
| 7,687,913 B2 | 3/2010 | Chakrapani | |
| 7,709,574 B2 | 5/2010 | Wan | |
| 7,727,635 B2 | 6/2010 | Furuya | |
| 7,754,003 B2 | 7/2010 | Aoki | |
| 7,815,864 B2 | 10/2010 | Betz | |
| 7,857,905 B2 | 12/2010 | Hayes | |
| 7,887,881 B2 | 2/2011 | Lu | |
| 8,232,234 B2 | 7/2012 | Raj | |
| 8,535,761 B2 | 9/2013 | Laine | |
| 8,563,409 B2 | 10/2013 | Morita | |
| 9,567,488 B2 * | 2/2017 | Fish | C09D 183/10 |
| 9,856,400 B2 | 1/2018 | Fish | |
| 10,647,885 B2 * | 5/2020 | Fish | B05D 3/0254 |
| 11,773,290 B2 | 10/2023 | Fish | |
| 2002/0015851 A1 | 2/2002 | Higuchi | |
| 2002/0114959 A1 | 8/2002 | Kang | |
| 2003/0083453 A1 | 5/2003 | Alexander | |
| 2003/0109633 A1 | 6/2003 | Kobayashi | |
| 2005/0239953 A1 | 10/2005 | Sakurai | |
| 2006/0121266 A1 | 6/2006 | Fandel | |
| 2006/0194707 A1 | 8/2006 | Lu | |
| 2006/0205861 A1 | 9/2006 | Gordon | |
| 2008/0015292 A1 | 1/2008 | Lens | |
| 2008/0178536 A1 | 7/2008 | Johnson | |
| 2008/0305611 A1 | 12/2008 | Hirota | |
| 2009/0253884 A1 | 10/2009 | Ogawa | |
| 2010/0075057 A1 | 3/2010 | Krannich | |
| 2010/0178521 A1 | 7/2010 | Byrne | |
| 2010/0279906 A1 | 11/2010 | Schwarz | |
| 2010/0297903 A1 | 11/2010 | Thiria | |
| 2010/0304152 A1 | 12/2010 | Clarke | |
| 2011/0033708 A1 | 2/2011 | Harimoto | |
| 2011/0086958 A1 | 4/2011 | Lortz | |
| 2011/0171447 A1 | 7/2011 | Krishnamoorthy | |
| 2011/0195259 A1 | 8/2011 | Song | |
| 2012/0107559 A1 | 5/2012 | Ferrar | |
| 2012/0141770 A1 | 6/2012 | Cadet | |
| 2012/0252923 A1 | 10/2012 | Serobian | |
| 2013/0112379 A1 | 5/2013 | Ko | |
| 2013/0122763 A1 | 5/2013 | Fish | |
| 2013/0302526 A1 | 11/2013 | Fish | |
| 2014/0234534 A1 | 8/2014 | Fish | |
| 2017/0107401 A1 | 4/2017 | Fish | |
| 2020/0283658 A1 | 9/2020 | Fish | |

FOREIGN PATENT DOCUMENTS

| | | |
|---|---|---|
| CN | 101768420 | 7/2010 |
| EP | 0495325 | 7/1992 |
| EP | 1217058 | 6/2002 |
| WO | 1992020634 | 11/1992 |
| WO | 2004078866 | 9/2004 |
| WO | 2005108543 | 11/2005 |
| WO | 2008134243 | 11/2008 |
| WO | 2011071698 | 6/2011 |

OTHER PUBLICATIONS

Dow Corning(R) US-CF-2403 Resin. Material Safety Data Sheet. Dow Corning Corporation, May 2013, p. 2. Retrieved from the Internet: <URL: http://www.specialchem4coatings.com/tds/dow-corning-us-cf-2403-resin/dow-corning/42805/ind ex.aspx>.

(56) References Cited

OTHER PUBLICATIONS

European Patent Office, Extended European Search Report for European Patent Application No. 13813395.4 dated Oct. 23, 2015.

First Office Action for Chinese Patent Application No. 201380045732. 6, dated May 5, 2016.

Hasan, Z., "Tooling for Composite Aerospace Structures: Manufacturing and Applications", Chapter 3—Tooling Materials and Processing, pp. 49-73, (2020).

International Application No. PCT/US2013/038644; International Search Report and Written Opinion of the International Searching Authority, date of mailing Jan. 28, 2014; 11 pages.

International Application No. PCT/US2013/040501; International Search Report and Written Opinion of the International Searching Authority, date of mailing Sep. 30, 2013; 11 pages.

International Application No. PCT/US2014/017596; International Search Report and Written Opinion of the International Searching Authority, date of mailing Jun. 5, 2014; 8 pages.

International Application No. PCT/US2014/039684; International Search Report and Written Opinion of the International Searching Authority, date of mailing Nov. 19, 2014; 14 pages.

International Application No. PCT/US2014/059139; International Search Report and Written Opinion of the International Searching Authority, date of mailing Jan. 2, 2015; 16 pages.

International Search Report and Written Opinion, related to PCT/US2013/049398, dated Dec. 20, 2013, 14 pages.

Kadklad RX23, www.kadko.com/products.html, Retrieved Jan. 14, 2014.

Office Action related to U.S. Appl. No. 13/935,443, dated Apr. 11, 2016, 14 pages.

Oshita, J et al. Synthesis of Poly{[bis(ethynylphenyl)silylene]phenylene}s with Highly Heat-Resistant Properties. Macromolecules. Aug. 1999, vol. 32, No. 19, pp. 5998-6002.

U.S. Appl. No. 15/395,642; Final Office Action, dated May 26, 2020; 12 pages.

U.S. Appl. No. 15/395,642; Applicant-Initiated Interview Summary, dated Jan. 29, 2020; 11 pages.

U.S. Appl. No. 15/395,642; Applicant-Initiated Interview Summary, dated Jun. 20, 2019; 2 pages.

U.S. Appl. No. 15/395,642; Applicant-Initiated Interview Summary, dated Jun. 21, 2019; 3 pages.

U.S. Appl. No. 15/395,642; Final Office Action, dated Mar. 3, 2021; 21 pages.

U.S. Appl. No. 15/395,642; Final Office Action, dated May 21, 2019, 16 pages.

U.S. Appl. No. 15/395,642; Non-Final Office Action, dated Dec. 4, 2018, 35 pages.

U.S. Appl. No. 15/395,642; Non-Final Office Action, dated Nov. 10, 2020; 18 pages.

U.S. Appl. No. 15/395,642; Non-Final Office Action, dated Nov. 20, 2019; 12 pages.

U.S. Appl. No. 15/395,642; Notice of Allowance, dated May 22, 2023; 8 pages.

* cited by examiner

HIGH PERFORMANCE SILICON-BASED COATING COMPOSITIONS

CROSS REFERENCE

This application claims the benefit of the filing date as a divisional of the U.S. patent application Ser. No. 15/395,642, filed on Dec. 30, 2016, now allowed, which is a continuation of the U.S. patent application Ser. No. 13/935,443 filed on Jul. 3, 2013, now U.S. Pat. No. 9,567,488, which claims the benefit of priority of U.S. Provisional Patent Application Ser. No. 61/667,559 filed Jul. 3, 2012, the disclosures of which are each incorporated by reference in their entireties for all purposes.

FIELD OF THE INVENTION

The present invention relates to silicon-based coating compositions formed from silicon monomers and macromers, such as silazanes, siloxanes, silanes, and optionally, organic and inorganic substituents, solvents and additives. The resultant composition can be used for coating a surface to form coatings having desired features including variable coefficient of friction characteristics, excellent mold release, high temperature and high heat resistance, and good hardness. Such coatings are useful in a wide range of applications.

BACKGROUND OF THE INVENTION

Chemical structure and conformation of a polymer are among the many factors that influence the type of coating required for a particular application. However, the commercial availability of many useful polymers often limits the applications. For example, for a long time polysilazanes have been synthesized and characterized, which acknowledges that such a polymer could be useful in a variety of applications. Currently, however, few products have been developed into a marketable commodity due to the extensive and costly synthesis needed to form the base resin products. In addition, the previous process had toxicity issues, for example, the formation of toxic ammonium salts and hydrochloric acid, which limits the availability of finished, user-friendly products.

An improved silicon-based coating is needed for use in a wide range of applications. Such coatings would be moisture and air curable at ambient temperature conditions without requiring an added catalyst or activator for rapid curing, or can be cured at elevated temperatures to increase the glass transition (Tg) properties of the finished product by enhancing the degree of crosslinking. Other advantageous characteristics of an improved silicon-based coating include being thin but durable, protective and heat-stable, displaying excellent hardness (for example, having a hardness of 5H or above), remaining intact even when the substrate is deformed. In addition, coatings that are customizable in terms of coating color, appearance, transparency, feel, and glossiness are desirable. Further, coatings being UV resistant, microbial releasable, easy to clean and maintain, and corrosion resistant are also in great need for their wide range of uses.

Another common problem in applying silicon-based coating relates to mold release coatings. Currently, many mold release problems are associated with a mold or surfaces of a molded part. For example, when the mold does not allow for a complete release, the removal of the molded part is much more difficult, such that mold or part surface will likely be damaged. Although one can use a release agent to facilitate the mold release, the release agent can result in resin build-up which causes physical tolerance alteration to the fabricated parts, and/or poor cosmetic appearance of the parts. Release agent build-up also creates an interrelated physical roughness and chemical reactivity of mold cavity surfaces. The friction of the rough surface then causes resin to continue to attach and stick to the cavities, crevices, pits or pores of the surfaces of the mold and the molded part. As a result, scrapping and/or sanding are subsequently required which lead to more and larger scratches, cavities or pitting on the mold surface that increase coefficient of friction. The increased coefficient of friction negatively affects the release of the molded part from the mold, the physical tolerance and appearance of the finished part, and the transferring of the release agent to the finished part. Additionally, the transfer of substances in the mold release coating to the surfaces of molded part is also a profound problem, which surface contamination creates problems of adhesion for applying primers and finish coats to the molded part.

Therefore, given the limitations of the prior art, it is desirable to have a coating composition that has superior release properties, such that the resultant coating has improved physical and chemical resistant properties and results in an easy- and simple-to-apply coating product possessing a number of desirable properties, including, but not limited to, 100% non-transferable, extended coverage, ultrathin, low odor, recoat-able, high heat and temperature resistant, applicable to higher temperature cures, for example, 1400° F. or higher, which constitute superior mold release characteristics than the current release products. Such coating provides an ultrathin barrier that prevents release agents, resins, substances, or other coatings from securing themselves to the molded part surface, crevices, indentations and/or micro-pores, and prevents surface contamination that may interfere with bonding between coatings, adhesives or the like and the surface of a finished part.

SUMMARY OF THE INVENTION

The present invention relates to silicon-based coating compositions, methods for applying the coating compositions, and coatings, typically cured coatings, formed from those compositions. These coatings are applicable to a wide range of surfaces, especially to molds, where easy release of the molded article is desired without also transferring or destroying the coating on the mold. The coating compositions of this invention, however, are not limited to molds, and may be applied to any surface where the properties of the cured coating are desired. The cured coating has a thickness between about 0.1 μm and about 40 μm and extreme release properties, is non-transferable, long-lasting, and can withstand high pressure, high temperature and/or extended temperatures without sacrificing the extreme release properties. As such, the cured coating allows for extended usable coverage, lower material usage, less re-coating application effort and time, reduced de-mold labor, time and effort, and thus much lower associated costs.

The coating composition is a mixture of constituents comprising appropriate portions of silazane, siloxane, silane, and optionally, organic solvents and other additives. The constituents may be monomers, macromers, oligomers, or polymers. This mixture is advantageously capable of curing under ambient conditions at room temperature without added heat, catalysts, or other additives, thereby forming a coating that is substantially free of unreacted Si—H bonds, and which contains a crosslinked polymer network comprising Si—O, Si—C, and Si—N bonds. Durability in particular is due to the prevalence of Si—C bonds in the crosslinked network structure of the coating. These coating compositions allow for a lower concentration of silazane resins in the formulation, increased penetration to the substrate, thereby reducing the cost, simplifying the steps of mixture preparation and processing, decreasing odor of the finished coating products, and greatly improving the durability of the cured coating.

In particular, the current invention relates to silicon-based coating compositions, which after curing, provide a mold release coating with superior release properties. The cured mold release coating may be 100% non-transferable to a finished composite part, can withstand high temperatures and high pressures, may have a thickness ranging between about 0.1 μm and about 40 μm, have a coefficient of friction between about 0.03 and about 0.04, and have a hardness ranging between about 4H and about 9H. The composition may be formed from a mixture of constituents comprising between about 0% (w/w) and about 76% (w/w) silazane, between about 0.2% (w/w) and about 4% (w/w) siloxane, and between about 1% (w/w) and about 9% (w/w) silane. These coating compositions may be applied to a substrate by any known method, in particular by transferring the coating composition to a substrate by wiping. The coating composition then cures to form a cured coating, preferably under ambient atmospheric conditions without added heat or catalyst.

Several embodiments capture particular ratios of constituents in the coating composition. In one embodiment, the silicon-based coating composition comprises between about 4% and about 12% (w/w) silazane, between about 0.2% and about 0.6% (w/w) siloxane; between about 4% and about 7% (w/w) silane, and between about 80% and about 92% (w/w) organic solvent prior to curing. In another embodiment, the silicon-based coating composition comprises between about 1% and about 4% (w/w) siloxane, between about 1% and about 4% (w/w) silane, and between about 92% and about 98% (w/w) organic solvent. In yet another embodiment, the silicon-based coating composition comprises between about 45% and about 55% (w/w) silazane, between about 1% and about 3% (w/w) silane, and between about 42% and about 54% (w/w) organic solvent. In other embodiments, the silicon-based coating composition comprises between about 56% and about 76% (w/w) silazane, between about 0.7% and about 1% (w/w) siloxane, between about 1% and about 2% (w/w) silane; and between about 21% and about 43% (w/w) organic solvent. In still another embodiment, the silicon-based coating composition comprising between about 7% and about 11% (w/w) silazane, between about 0.2% and about 0.6% (w/w) siloxane, between about 5% and about 9% (w/w) silane, and between about 79% and about 89% (w/w) organic solvent.

In addition, the present invention further provides a method of coating a surface. The method comprises mixing a mixture of constituents to form a silicon-based coating composition comprising, for example, from about 0% (w/w) to about 76% (w/w) silazane, from about 0.2% (w/w) to about 4% (w/w) siloxane, and from about 1% (w/w) to about 9% (w/w) silane. Next, the mixture is coated onto a surface and curing the coating ambiently with or without additional heat. This method may be applied to mixing any silicon-based coating composition described herein, and may be applied to any surface.

The present invention also provides a cured silicon-based coating. The coating is formed from a mixture of constituents comprising from about 0% (w/w) to about 76% (w/w) silazane, from about 0.2% (w/w) to about 4% (w/w) siloxane, and from about 1% (w/w) to about 9% (w/w) silane. The coating is substantially free of Si—H bonds. The coating also comprises a polymer network comprising Si—O bonds and Si—C bonds. In further embodiments, the coating may be non-transferable, has a thickness ranging between about 0.1 μm and about 3 μm, have coefficient of friction between from about 0.03 to about 0.04, and have a hardness ranging between about 4H and about 9H.

BRIEF DESCRIPTION OF THE FIGS.

DETAILED DESCRIPTION OF THE INVENTION

Figure 1:
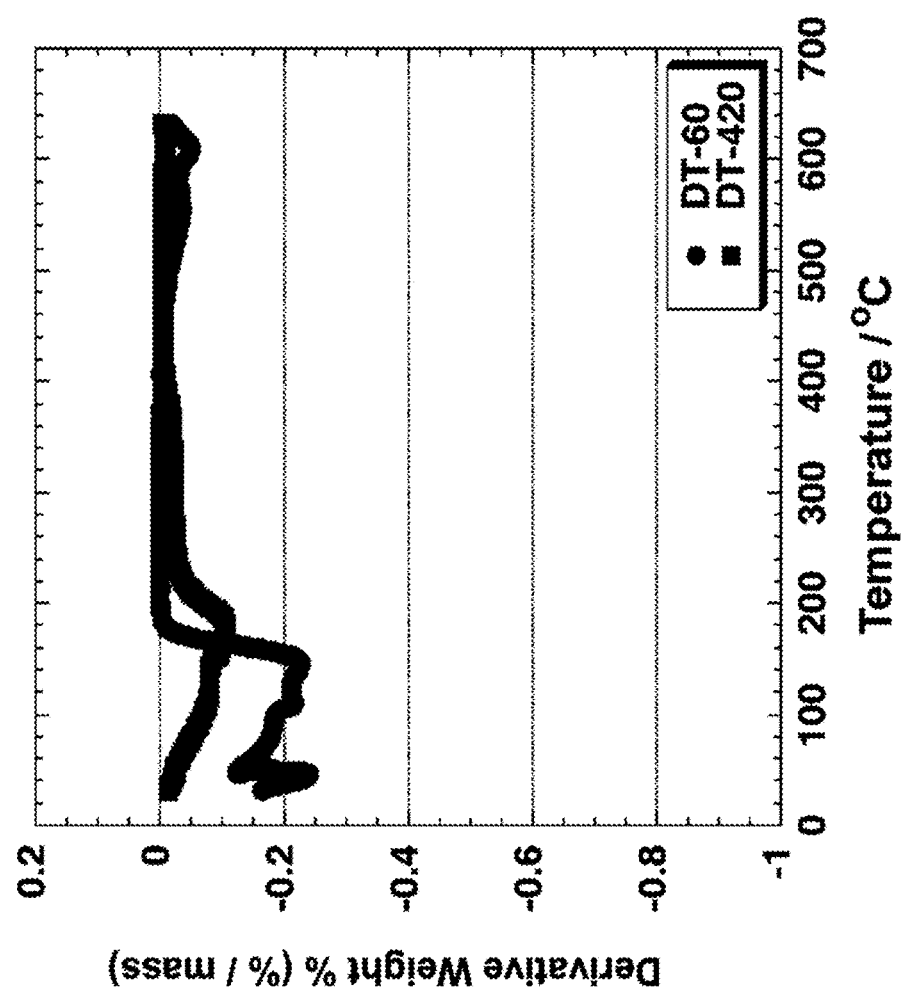
FIG. 1 depicts the result of differential thermal analysis (DTA) of DT-6060 and DT-420 coatings tested from 25° C. to 650° C. The plot for DT-420 is shown in dark gray and the plot for DT-6060 is shown in light gray.

The present invention relates to silicon-based coating compositions, methods for applying the coating compositions, and coatings formed from those compositions. These coatings are applicable to a wide range of surfaces, especially to molds, where easy release of the molded article is desired without also transferring or destroying the coating on the mold. The cured coatings, however, may be applied to any surface for protection, including both the molding and tooling surfaces (surfaces of the molded part), underlying finish and/or substrates, in a wide range of applications.

By way of example, composite parts are often formed using vacuum bagging, where the vacuum tightly compresses the composite part while removing entrapped air and/or volatiles. But the mold surfaces develop leaks as a result of the cyclic stresses caused by the continued heating, cooling, and vacuum compressing. These leaks arise from physical deterioration of the resin and its bonds to the fibers within the mold tool structure. This deterioration prevents the vacuum from pulling at an adequate pressure. As the deterioration progresses, small micro-pores, fractures, and even cracks form, allowing air to be drawn in and pass through the mold surface and its structural substrata, thus lessening or preventing the vacuum levels needed to create appropriate properties within the finished composite part.

The silicon-based mold release coating compositions described herein overcome these problems. The silicon-based coating compositions absorb and penetrate deeply into the areas known to contain micro-pores, fractures and cracks on the face side of the mold tool. After the coatings cured, the possible vacuum levels increased during subsequent testing, indicating that openings in the mold had been filed. Repeated applications of the coating composition onto the mold tool restored it to levels equal to or better than when the mold tool was new. Moreover, the physical dimensions of the mold tool were not measurably changed. The mold tool could maintain its vacuum integrity during normal use with the periodic reapplication of the silicon-based coating compositions to the surface, as is common practice in the art.

The cured coatings formed from the coating compositions are clear, thin, hard, slick, having a shortened curing process, and with resistance or high endurance to adverse conditions including, but not limited to, drag, pull, scrub, friction, heat, moisture, high temperature, low temperature, microbial growth, corrosion, and the like. These cured coatings have superior properties to coatings formed from any of the individual ingredients by themselves, as a result of chemical reactions between the individual ingredients during curing. The cured coating has a thickness between about 0.1 µm and about 40 µm and extreme release properties, is non-transferable, long-lasting, and can withstand high pressure, high temperature and/or extended temperatures without sacrificing the extreme release properties. As such, the cured coating allows for extended usable coverage, lower material usage, less re-coating application effort and time, reduced de-mold labor, time and effort, and thus much lower associated costs.

The compositions comprise silane and either or both of silazane and siloxane, and may further comprise one or more organic or inorganic substituents, non-reactive solvents, and/or one or more additives for curing or for finishing, each of which in a proportion as designed herein to achieve certain properties.

The silicon-based coating compositions of the present invention, prior to curing, include a silazane constituent. "Silazane" and "polysilazane," as appearing in the specification and claims are generic terms intended to include compounds which contain one or more silicon-nitrogen bonds in which the nitrogen atom is bonded to at least two silicon atoms, and may or may not contain cyclic units. Therefore, the terms "polysilazane" and "silazane polymer" include monomers, oligomers, cyclic, polycyclic, linear polymers or resinous polymers having at least one Si—N group in the compound, or having repeating units of $H_2Si$—NH, that is, $[H_2Si-NH]_n$, with "n" greater than 1. The chemical structure for polysilazane is shown below.

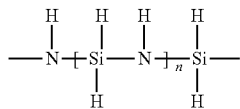

By "oligomer" is meant any molecule or chemical compound which comprises several repeat units, generally from about 2 to 10 repeat units. A simple example of silazane oligomer is disilazane $H_3Si$—NH—$SiH_3$. "Polymer" or "copolymer", as used herein, means a molecule or compound which comprises a large number of repeat units, generally greater than about 10 repeat units. The oligomeric or polymeric silazanes may be amorphous or crystalline in nature. Silazane polymer chains having both large chains and small rings with a wide range of molecular mass are called polysilazanes. Polysilazane or a mixture of polysilazanes known in the art or commercially available include such products generally known among persons skilled in the art as silazanes, disilazanes, polysilazanes, ureasilazanes, polyureasilazanes, aminosilanes, organosilazanes, organopolysilazanes, inorganic polysilazanes, and others employing liquid anhydrous ammonia in their production. A polysilazane with the general formula $(CH_3)_3Si$—NH—$[(CH_3)_2Si-NH]_n$—$Si(CH_3)_3$ is designated as polydimethylsilazane. One group of polysilazane, $[R_1R_2Si-NH]_n$, is isoelectronic with and close relatives to polysiloxane $[R_1R_2Si-O]_1$. Additionally, Si—N bond can be found in triethylsilylamine $((H_5C_2)_3Si-NH_2)$, which is a typical aminosilane. Further, small ring-shaped molecules with a basic group of Si—N are called "cyclosilazanes." For example, triazatrisilane $(H_9N_3Si_3)$ is a typical cyclotrisilazane.

A silazane constituent is commonly produced by ammonolysis of a halosilane, such as a chlorosilane or and organochlorosilane. In this process, the nitrogen nucleophilically attacks the carbon alpha to the chlorine, forming a new Si—N bond and releasing hydrochloric acid (HCl) as a byproduct. The HCl then reacts with excess ammonia in the reaction mixture, producing ammonium chloride. Because of the ammonolysis process, the silicon and nitrogen atoms have a preferable distribution within the cured coating composition.

If the silazane is not properly isolated after synthesis, the silazane constituent will contain residual ammonia reactant, free amine from side reactions, and ammonium chloride byproduct. These nitrogen-containing materials are undesirable at least because of their environmental toxicity. Also, the first- and second-order elimination reaction may lead to alkyl and vinyl substituents, producing, for example, chloromethylvinylsilane, chlorodivinylsilane, dichloroethylvinylsilane, chloromethyldivinylsilane, etc., depending on the organochlorosilane starting material. The vinyl groups are particularly an issue because they can react with compounds of low molecular weight that are mixed with the constituents before curing and initiate and facilitate polymerization reactions. These polymerization reactions increase the chain length and the degree of three-dimensional crosslinking of the polymer networks in the cured coatings. As a result, they have much higher mass ranges and significantly improved material properties.

The polymerization processes include, but are not limited to, step-growth polymerization, polyaddition, and polycondensation. More specifically, polymerization can be initiated by mechanisms, such as acid- or base-catalysis, or free radical polymerization. It may comprise ring-opening copolymerization, and the formation of inorganic and/or organic polymer networks. The actual mechanisms of polymerization depend on the functional groups of the reacting polymeric and monomeric compounds, as well as inherent steric effects. Conceptually new materials can be formed by adding non-conventional starting materials into the polymerization process, such as ammonia.

For polymerized silicon-based materials, ammonia is used to dissolve and age the materials, which must be carefully regulated through venting to control the molecular weight of the resin starting material. This reaction results in a $R_3Si$—$NH_2$ group to form silazane units by releasing off the ammonia. High moisture and/or water will cause decomposition of the polymerized silicon-based material, due to the water molecule attacking the silicon atoms and the Si—N bonds are then severed. This reaction produces a R₃Si—NH₂ and HO—SiR₃ which further react to form R₃Si—O—SiR₃ siloxane. The polymerized liquid is clear to translucent, colorless to pale yellow, and may form a solid. Exposure to higher temperature and or sunlight can also increase the mass of the polymerized liquid by encouraging further thermal or photochemical polymerization. In the liquid form, trace elements, free ammonia and ammonium chloride can often be detected.

"Prepolymer" refers to polymeric structures formed by the processes in the present invention are long term-stable liquids, and possess only moderate odors, which mostly arise from the use of organic solvents (with acceptable toxicity, such as tert-butyl acetate). In the solid form, these polymerized materials can be handled similar to thermosetting or thermoplastic processes. Molecular weight can vary from about 2,000 g/mol up to as much as 100,000 g/mol, depending on process. The density of the prepolymers is normally around 1 g/cm³.

Polysilazanes usually do not vaporize due to the strong molecular interactions. Heat promotes crosslinking of the polysilazanes to form an even higher molecular weight structures. For example, at temperatures of 100-300° C., hydrogen gas evolves and ammonia promotes further crosslinking. As provided in the present invention, vinyl substituents promote continued crosslinking, increased molecular strength, and conversion of liquid resins into solids. Once temperatures reach 700-1200° C., the multi-dimensional amorphous network with Si, C and N atoms is formed, resulting in SiCN ceramic. This "pyrolysis" of polysilazanes produces ceramic materials with low viscosity in high yield. This also makes the polysilazanes an excellent choice for precursors for other ceramic matrices. As provided in the present invention, polymers combined with low molecular weight components offer added value for the generation of resistant and fast-curing coatings, because new chains can be formed that can improve and enhance the resulting material properties.

Alternatively, polysilazane is commercially available. For example, polysilazane (<99%) in tert-butyl acetate solvent manufactured by KiON Defense Technologies, Inc. (Huntingdon Valley, PA) as KDT Ambient Cure Coating Resin (KDT HTA® 1500), is supplied as a 100% solids liquid of low viscosity. KDT HTA® 1500 may comprise more than 99% polysilazane. KDT HTA® 1500 may comprise less than 5% cyclosilazane, a cyclic form of polysilazane. A similar product is also available from other manufacturers, including AZ Electric Materials (Branchburg, N.J.), the parent company to KiON.

Polysilazane as provided in the form of KDT HTA® 1500 resin may comprise between about 0% and about 76% (w/w) of the total formula weight of silicon-based coating compositions. In one embodiment, the silicon-based coating composition does not contain polysilazane in the form of KDT HTA® 1500 resin or the like. In some embodiments, polysilazane in the form of KDT HTA® 1500 resin or the like (A-Resin, as designated herein) comprises about 76%, 70%, 65%, 62%, 57%, 52%, 47%, 42%, 37%, 32%, 27%, 22%, 12%, 10%, 8%, 5%, 4%, 3%, 2%, 1%, 0% (w/w), or any range thereof, of the silicon-based coating composition. For example, the amount of polysilazane, in the form of KDT HTA® 1500 resin or the like, present in the silicon-based coating composition may range from between about 0% to about 3%, between about 2% to about 4%, between about 4% to about 6%, between about 5% to about 8%, between about 6% to about 9%, between about 7% to about 10%, between about 8% to about 11%, between about 9% to about 12%, between about 10% to about 15%, between about 12% to about 22%, between about 18% to about 28%, between about 25% to about 35%, between about 32% to about 42%, between about 40% to about 50%, between about 48% to about 58%, between about 55% to about 65%, between about 60% to about 70%, between about 68% to about 76%, (w/w) of the total composition, and preferably ranges from between about 0% to about 1%, between about 4% to about 12%, between about 6% to about 10%, between about 7% to about 9%, between about 45% to about 55%, between about 56% to about 76%, between about 7% to about 11%, (w/w) of the total composition. In an exemplary embodiment, the amount of polysilazane, in the form of KDT HTA® 1500 resin or the like, present in the composition is between about 7% to about 8%, (w/w) of the total composition. In another exemplary embodiment, the amount of polysilazane, in the form of KDT HTA® 1500 resin or the like, present in the composition is 0% (w/w) of the total composition.

The silicon-based coating compositions of the present invention may also include a siloxane. A "siloxane" is a chemical compound having branched or unbranched backbones consisting of alternating silicon and oxygen atoms —Si—O—Si—O— with side chains R attached to the silicon atoms ($R_1R_2SiO$), where R is a hydrogen atom or a hydrocarbon group. Polymerized siloxanes, including oligomeric and polymeric siloxane units, with organic side chains (R≠H) are commonly known as polysiloxanes, or $[SiOR_1R_2]_n$, wherein n is greater than 1. The chemical structure for a linear polysiloxane is shown below:

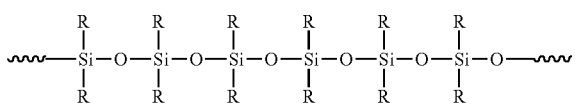

In addition to hydrogen, $R_1$ and $R_2$ of polysiloxane may be independently selected from the group consisting of alkyl, alkenyl, cycloalkyl, alkylamino, aryl, aralkyl, or alkylsilyl. Thus, $R_1$ and $R_2$ may be, for example, methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. These alkyl, alkenyl, cycloalky, aryl, alkyl amino, aralkyl and alkylsilyl groups may each optionally be substituted by one or more substituents which contain heteroatoms, such as halides, like chlorine, bromine and iodine; alkoxy groups, like ethoxy, and also acyl groups, such as acetyl and propionyl. Organic side groups can be used to link two or more of these —Si—O— backbones together. By varying the —Si—O— chain lengths, side groups, and crosslinking, polysiloxanes can vary in consistency from liquid to gel to rubber to hard plastic. Representative examples of polysiloxane are [SiO(CH₃)₂]ₙ (polydimethylsiloxane, PDMS) and [SiO(C₆H₅)₂]ₙ (polydiphenylsiloxane). In a preferred embodiment, the silicon-based coating composition comprises polydimethylsiloxane. The chemical structure for polydimethylsiloxane is shown below.

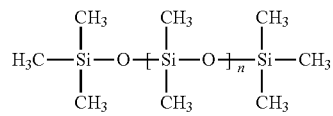

Octamethyltrisiloxane, [(CH$_3$)$_3$SiO]$_2$Si(CH$_3$)$_2$, is a linear siloxane in the polydimethylsiloxane family, with the INCI name as Trisiloxane. The chemical structure for octamethyltrisiloxane is shown below.

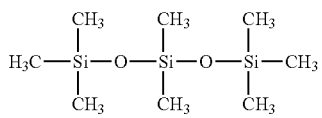

Other methylated siloxanes include, but are not limited to: hexamethyldisiloxane, cyclotetrasiloxane, octamethylcyclotetrasiloxane, decamethyltetrasiloxane, decamethylcyclopentasiloxane. The method of producing high molecular weight polysiloxane product was disclosed in US. App. Pub. 2009/0253884. In addition, polysiloxane is also commercially available. As one example, polysiloxane, specifically, polydimethylsiloxane, is supplied in isopropyl acetate solvent by Genesee Polymers Corp. (Burton, MI), and it is sold as Dimethyl Silicone Fluids G-10 product. Polysiloxane as provided in the form of Dimethyl Silicone Fluids resin (B-Resin, as designated herein, containing up to 5% polysiloxane) comprises between about 0.2% and about 4% (w/w) of the total formula weight of silicon-based coating compositions. In one embodiment, the silicon-based coating composition does not contain polysiloxane in the form of Dimethyl Silicone Fluids. In some embodiments, polysiloxane, in the form of Dimethyl Silicone Fluids or the like, comprises about 4%, 3.7%, 3.5%, 3.2%, 3.0%, 2.7%, 2.5%, 2.3%, 2.1%, 2.0%, 1.9%, 1.7%, 1.5%, 1.3%, 1.1%, 1.0%, 0.7%, 0.5%, 0.4%, 0.3%, 0.2% (w/w), or any range thereof, of the silicon-based coating composition. For example, the amount of polysiloxane, in the form of Dimethyl Silicone Fluids or the like, present in the silicon-based coating composition may range from between about 0.2% to about 0.5%, between about 0.4% to about 1.5%, between about 1% to about 2%, between about 1.5% to about 2.2%, between about 1.8% to about 2.5%, between about 2.0% to about 2.8% (w/w), between about 2.5% to about 3.0%, between about 2.8% to about 3.5%, between about 3.0% to about 3.8%, between about 3.5% to about 4.0%, (w/w), of the total composition, and preferably ranges from between about 0.2% to about 0.6%, between about 1% to about 4%, between about 0.7% to about 1%, (w/w) of the total composition. In an exemplary embodiment, the amount of polysiloxane, in the form of Dimethyl Silicone Fluids or the like, present in the composition is about 0.4% (w/w) of the total composition. In another exemplary embodiment, the amount of polysiloxane, in the form of Dimethyl Silicone Fluids or the like, present in the composition is 2% (w/w) of the total composition. In another exemplary embodiment, the amount of polysiloxane, in the form of Dimethyl Silicone Fluids or the like, present in the composition is 0.6% (w/w) of the total composition. In still another exemplary embodiment, the amount of polysiloxane, in the form of Dimethyl Silicone Fluids or the like, present in the composition is 3% (w/w) of the total composition. In still another exemplary embodiment, the amount of polysiloxane, in the form of Dimethyl Silicone Fluids or the like, present in the composition is 0.8% (w/w) of the total composition. In yet another exemplary embodiment, the amount of polysiloxane, in the form of Dimethyl Silicone Fluids or the like, present in the composition is 3.5% (w/w) of the total composition.

The silicon-based coating compositions of the present invention may further include polymerized silane. Silanes are compounds which contain one or more silicon-silicon bonds. Polysilanes [R$_1$R$_2$Si—R$_1$R$_2$Si]$_n$ are a large family of inorganic polymers. The number of repeating units, "n," determines the molecular weight and viscosity of the composition. Like in polysiloxane, R$_1$ and R$_2$ are independently selected from the group consisting of hydrogen, alkyl, alkenyl, cycloalkyl, alkylamino, aryl, aralkyl, or alkylsilyl. Thus, R$_1$ and R$_2$ may be, for example, methyl, ethyl, propyl, butyl, octyl, decyl, vinyl, allyl, butenyl, octenyl, decenyl, tetradecyl, hexadecyl, eicosyl, tetracosyl, cyclohexyl, methylcyclohexyl, methylamino, ethylamino, phenyl, tolyl, xylyl, naphthyl, benzyl, methylsilyl, ethylsilyl, propylsilyl, butylsilyl, octylsilyl, or decylsilyl. A polymer with the general formula —[(CH$_3$)$_2$Si—(CH$_3$)$_2$Si]—$_n$, is designated as polydimethylsilane. The chemical structure of polydimethylsilane is shown below.

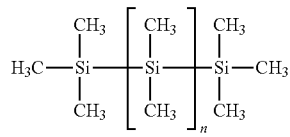

High molecular weight polysilane product with a narrow molecular weight distribution may be obtained by the process of U.S. Pat. No. 5,599,892. Polysilane is also available as a resin system supplied in amyl acetate blend from Kadko, Inc. (Beech Grove, Indiana), and it is sold as a KADKLAD R2X3™ product. Polysilane as provided in the form of KADKLAD R2X3 resin (C-Resin, as designated herein, containing polysilane up to 8%) comprises between about 1% and about 9% (w/w) of the total formula weight of silicon-based coating compositions. In one embodiment, the silicon-based coating composition does not contain polysilane in the form of KADKLAD R2X3 resin. In some embodiments, polysilane, in the form of KADKLAD R2X3 resin or the like, comprises about 9%, 8.7%, 8%, 7.6%, 7%, 6.7%, 6.5%, 6.0%, 5.8%, 5.5%, 5.3%, 5%, 4.7%, 4.5%, 4.3%, 4%, 3%, 2%, 1% (w/w), or any range thereof, of the silicon-based coating composition. For example, the amount of polysilane, in the form of KADKLAD R2X3 resin or the like, present in the silicon-based coating composition may range from between about between about 2% to about 3.2%, 3% to about 4.2%, between about 4% to about 4.8%, between about 4.5% to about 5.1%, between about 4.8% to about 5.4%, between about 4% to about 4.7%, between about 4.5% to about 6.2%, between about 4.8% to about 6.5%, between about 5.1% to about 6.7%, between about 5.4% to about 7%, between about 6.4% to about 7.8%, between about 7.2% to about 8.4%, between about 8.2% to about 9%, (w/w) of the total composition, and preferably ranges from between about 1% to about 3%, between about 4% to about 7%, between about 5% to about 9%, (w/w) of the total composition. In an exemplary embodiment, the amount of polysilane, in the form of KADKLAD R2X3 resin or the like, present in the composition is about 5.8% (w/w) of the total composition. In another exemplary embodiment, the amount of polysilane, in the form of KADKLAD R2X3 resin or the like, present in the composition is 4% (w/w) of the total composition. In another exemplary embodiment, the amount of polysilane, in the form of KADKLAD R2X3 resin or the like, present in the composition is 8% (w/w) of the total composition. In another exemplary embodiment, the amount of polysilane, in the form of KADKLAD R2X3 resin or the like, present in the composition is 6% (w/w) of the total composition. In another exemplary embodiment, the amount of polysilane, in the form of KADKLAD R2X3 resin or the like, present in the composition is 3% (w/w) of the total composition. In yet another exemplary embodiment, the amount of polysilane, in the form of KADKLAD R2X3 resin or the like, present in the composition is 2% (w/w) of the total composition. In yet another exemplary embodiment, the amount of polysilane, in the form of KADKLAD R2X3 resin or the like, present in the composition is 1.7% (w/w) of the total composition. In still another exemplary embodiment, the amount of polysilane, in the form of KADKLAD R2X3 resin or the like, present in the composition is 1.0% (w/w) of the total composition.

The silicon-based coating compositions of the current invention may additionally include one or more organic solvents. Generally, the organic solvent is defined as a carbon-containing chemical that is capable of dissolving a solid, liquid, or a gas. Although one skilled in the art will appreciate that a wide variety of solvents may be incorporated into the current invention, suitable solvents for the present invention are those that contain no water and no reactive groups such as hydroxyl or amine groups. These solvents include, but not limited to, for example, aromatic hydrocarbons, such as benzene and toluene; aliphatic hydrocarbons, such as, hexane, heptane, branched-chain alkanes (isoparaffins); halogenated hydrocarbons; esters, such as methyl acetate, n-butyl acetate, tert-butyl acetate, isobutyl acetate, sec-butyl acetate, ethyl acetate, amyl acetate, pentyl acetate, 2-methyl butyl acetate, isoamyl acetate, n-propyl acetate, isopropyl acetate, ethylhexyl acetate; ketones, such as acetone or methyl ethyl ketone; ethers, such as tetrahydrofuran, dibutyl ether; acetate ester, such as carboxylic ester where the carboxylic acid component is acetic acid; and mono- and polyalkylene glycol dialkyl ethers (glymes) or mixtures of these solvents may be used. In a preferred embodiment, the organic solvent comprises n-butyl acetate. In another preferred embodiment, the organic solvent comprises tert-butyl acetate. In yet another preferred embodiment, the organic solvent comprises isoparaffins.

In addition, the organic solvent generally comprises between about 20% to about 98% (w/w) of the silicon-based coating composition. In some embodiments, the organic solvent comprises about 98%, about 95%, about 90%, about 85%, about 80%, about 75%, about 70%, about 65%, about 60%, about 55%, about 40%, about 35%, about 30%, about 25%, about 20%, (w/w) of the total composition. For example, the amount of organic solvent present in the silicon-based coating composition preferably ranges from between about 80% to about 92% (w/w) of the composition. In another embodiment, the amount of organic solvent in the silicon-based coating composition ranges from between about 80% to about 95% (w/w) of the total composition. In another embodiment, the amount of organic solvent in the silicon-based coating composition ranges from between about 90% to about 98% (w/w) of the total composition. In an additional embodiment, the amount of organic solvent in the silicon-based coating composition ranges from between about 42% to 54% (w/w) of the total composition. In still another embodiment, the amount of organic solvent in the silicon-based coating composition ranges from between about 21% to 43% (w/w). In still another embodiment, the amount of organic solvent in the silicon-based coating composition ranges from between about 79% to 89% (w/w).

The silicon-based coating compositions of the current invention may further include one or more organic or inorganic substituents. The optional organic or inorganic substituents may be added to introduce reactive groups into the reaction and thus to the copolymer. For example, by selecting the organochlorosilanes used, the polymerizable side chains of the copolymer may vary. Suitable organochlorosilanes that may be added include, but not limited to, chloromethylvinylsilane, chlorodivinylsilane, dichloroethylvinylsilane, dichloromethylvinylsilane, and chloroethylmethyldivinylsilane. The vinyl groups may react with other compounds of low molecular weight that are mixed with the constituents before curing. These changes in the reaction process increase the chain length and the degree of three-dimensional crosslinking of the resulting macromolecule-networks. As a result, they have much higher mass ranges and significantly improved material properties.

The silicon-based coating compositions of the current invention may further comprise one or more additives, including, but not limited to curing agents, pigments, tracing dyes, fillers, flow control agents, dry flow additives, anti-cratering agents, surfactants, texturing agents, light stabilizers, matting agents, photosensitizers, wetting agents, antioxidants, plasticizers, opacifiers, stabilizers, ceramic microspheres, slip agents, dispersing agents, mica pigments, and surface altering additives.

Generally, neither catalyst nor hardener is needed to cure coatings of the present invention. In some embodiments of the present invention, each polymer in the composition can be cured independently without the need of forming copolymers. In other embodiments, substances or mixtures of substances may be added to a coating composition to promote or control the curing reaction, for example curing agents such as catalysts and hardeners. As generally known, curing catalyst increases the rate of a chemical reaction as an initiator. It is added in a small quantity as compared to the amounts of primary reactants, and does not become a component part of the chain. In contrast, curing hardener, often an amine, enables the formation of a complex three-dimensional molecular structure by chemical reaction between the polymers and the amine. It is essential that the correct mix ratio is obtained between resin and hardener to ensure that a complete reaction takes place, such that no unreacted resin or hardener will remain within the matrix to affect the final properties after cure. Conventional polyamine hardeners comprise primary or secondary amine groups. A polysilazane-modified polyamine hardener was described in U.S. Pat. No. 6,756,469, providing heated polyamine in the presence of a polysilazane to prepare a hardener imparting enhanced high temperature properties, higher char yields, and better adhesion properties.

In a particular embodiment, vinyl groups present in the silicon-based constituents may act as reaction promoters, increasing the rate and extent of polymerization of the coating during curing. The vinyl groups may be present in any one or more of the constituents of the silicon-based coating compositions, for example, within the silazane, siloxane, or silane constituent. During polymerization, the vinyl groups are substantially consumed, forming new covalent bonds within crosslinked polymer network of the cured coating. The concentration and distribution of vinyl groups within the coating.

The matting agents used in the practice of this invention typically can alter the surface of a coating in such a way that the light falling on it is scattered in a defined fashion. The matting agent particles stand out from the coating, and are invisible to the human eye. The color of the coating is not affected to any great extent. Representative examples of such matting agents include inorganic matting agents such as silica-based ACEMATT® matting agents from Evonik Degussa (Parsippany, N.J.) and silica-based matting agents available from Ineos Silicas (Hampshire, United Kingdom). The matting agents may vary in size and include materials that are micron sized particles. For example, the particles may have an average diameter of from about 0.1 to 1000 microns, and in one embodiment from 0.1 to 100 microns. Combinations of matting agents may be used.

In addition, the coating composition additives typically comprise less than about 30% of the total silicon-based coating composition. In some embodiments, the additive comprises about 30%, about 25%, about 20%, about 15%, about 10%, about 9%, 8%, 7%, 6%, 5%, 4%, 3%, 2%, 1%, 0.1%, or 0% (w/w) of the total composition.

The coating composition may be applied by dipping, spraying, brushing, painting, wiping, immersion, or spin-coating techniques. These procedures typically provide polymer coatings of thicknesses on the order of 1 µm or thinner, to up to about 75 µm per coat for the cured polymers. If a thicker coating is desired, multiple coating layers may be provided. The mold release coat formulations as provided herein result in a coating transparent and therefore do not affect the optical appearance of the substrate, which leaves mold inspection unaffected. Due to the small coating thicknesses, only a very small amount of material is required, which is advantageous both in terms of cost and also ecologically, and the weight change of the substrate to be coated is nearly unnoticeable. The coating thickness of the silicon-based coating as provided herein following evaporation of the solvent and curing is in the range from about 0.1 µm to about 50 µm. In some embodiments the coating thickness is from about 0.5 µm to about 40 µm. In some embodiments, the coating thickness is from about 0.1 µm to about 25 µm. In some other embodiments, the coating thickness is from about 1 µm to about 3 µm. Yet, in some embodiments, the coating thickness is from about 5 µm to about 9 µm. The mold release coating as provided herein can be re-applied onto itself for touch up, repeated application over time, or after mold repairs.

"Curing" refers to the process of polymerization after the coating is applied. Curing may be controlled through temperature, air flow, ratio of the solvents, choice of resin and hardener compounds, and the ratio of said compounds. The curing process can take minutes to hours. Some formulations benefit from heating during the cure period, whereas typically formulation simply require time and ambient temperatures. In other situation, the curing can be at elevated temperatures to increase the glass transition (Tg) properties of the finished coating product by enhancing the degree of crosslinking. Coatings ambiently cured may be at room temperature ranging from 5-40° C. By providing slight amount of heat the curing time can be shortened. Preferably, curing is performed at temperatures not exceeding about 100° C. Higher temperature may be applied as needed. The curing atmospheres include, but are not limited to, air and other non-reactive or reactive gaseous environments which contain moisture, inert gases like nitrogen and argon, and reactive gases such as ammonia, hydrogen, carbon monoxide, and so on. Rapid cure times are achieved using this method when the applied coatings are exposed to the moisture-containing atmosphere at room temperature.

Coating-related testing provides quality control and product description based on industrial standards. Typical coating tests may include, but not be limited to, testing thickness, coefficient of friction, hardness, scratch resistance, the amount of force needed to scratch the coating from substrate; 90 degree peel from topcoat test; 90 degree peel from adhesive test; cross-hatch adhesion test; UV endurance test; heat stability test; conical bend test, impact direct and indirect test. In particular, thickness test, measuring the thickness of substrates and top-coated materials, may be carried out using test panels on which uniform films are produced by a coating suitable for spraying; using micrometers for dried films; using magnetic gauges for nonmagnetic coatings; using Wet Film Thickness Gauge or Pfund Gauge for wet film thickness; or using microscopic observation of precision angular cuts in the coating film. Hardness test of organic materials may be carried out using indentation hardness measurements, Sward-type hardness rocker instruments, or pendulum damping testers.

In addition, the "kinetic coefficient of friction" (COF, µ), also known as a "frictional coefficient" or "friction coefficient", describes the ratio of the force of friction between two bodies and the force pressing them together. Coefficients of friction range from near zero to greater than one. Rougher surfaces tend to have higher effective values. The COF measured under ASTM D1894 is called Standard COF. More standard ASTM (American Society for Testing and Materials) test methods for coatings are available at http://wernerblank.com/polyur/testmethods/coating_test.htm.

Preferably, in one embodiment, the thickness of the silicon-based coating resulted from the compositions provided herein is between from about 0.1 µm to about 45 µm. In one embodiment, the hardness of the silicon-based coating resulted from the compositions provided herein ranges from about 4H to about 9H, using ASTM D3363. Further, in one embodiment, the COF of the silicon-based coating resulted from the compositions provided herein is between from about 0.03 to about 0.04.

Mold surfaces, substrates and substrate layers suitable for coating compositions provided herein may comprise any desirable substantially solid material that vary widely. For example, the type of surfaces that can be treated with the compositions of this invention includes glass; fiberglass; carbon fiber composites; basalt fiber composites; siloxane and ceramic fibers; ceramics, such as, silicon nitride, silicon carbide, silica, alumina, zirconia, and the like; metals, such as, for example, iron, stainless steel, galvanized steel, zinc, aluminum, nickel, copper, magnesium and alloys thereof, silver and gold and the like; plastics, such as, polymethyl methacrylate, polyurethane, polycarbonate, polyesters including polyethylene terephthalate, polyimides, polyamides, epoxy resins, ABS polymer, polyethylene, polypropylene, polyoxymethylene; porous mineral materials, such as, concrete, clay bricks, marble, basalt, asphalt, loam, terracotta; organic materials, such as wood, leather, parchment, paper and textiles; and coated surfaces, such as, plastics emulsion paints, acrylic coatings, epoxy coatings, melamine resins, polyurethane resins and alkyd coatings. The surface or substrate contemplated herein may also comprise at least two layers of materials. One layer of material, for example, may include glass, metal, ceramic, plastics, wood or composite material. Other layers of material comprising the surface or substrate may include layers of polymers, monomers, organic compounds, inorganic compounds, organometallic compounds, continuous layers, porous and nanoporous layers.

Further, the mold surfaces and substrates may have different shapes, e.g., substrates having flat, planar surfaces, molded articles having curved surfaces, fibers, fabrics, and the like. It will be appreciated by those skilled in the art that the foregoing lists are merely illustrative of various materials which may be coated using the presently disclosed compositions and methods, and are not in any way limiting of the different substrates with which the present invention is useful. Insofar as they protect virtually any type of substrate from oxidative thermal degradation, corrosion, or chemical attack. The coatings may also be used to strengthen relatively flaw sensitive brittle substrates such as glass and non-wetting surfaces. The coatings may additionally be useful to provide bonding or compatibility interfaces between different types of materials.

A particularly advantageous, but non-limiting, use of this coating is for mold surfaces that undergo high pressure and temperature, and multiple pulls. A protective film provided by the silicon-based coating compositions disclosed herein over the base layer of paint or surface material of these mold surfaces is particularly useful to provide long lasting protection, in comparison to other materials in market, from various external forces, which can be destructive over a period of time. Other advantageous, but non-limiting, use of the coatings provided herein is to coat on automobile, aircraft, missiles, aerospace components, marine vessels, wheels, wind generation equipment and blades, engine shrouds, car exhausts, smoke stacks, industrial kilns, combustion chambers, industrial duct and pipe systems, solar panels, electronic components, fire and safety appliance, insulation and energy systems, building surfaces, public spaces, packaging surfaces, outdoor signs and advertisement billboard or LED screens, food- and beverage-processing equipment, cookware and containers. Those surfaces are exposed to UV, heat, coldness, moisture, ice build-up, chemical corrosion, and wear and tear from natural physical forces creating friction such as, water, air flow and dust. In addition, such protection is particularly suitable for mechanical components exposed to high temperatures, including, for example, exterior aircraft surfaces, a wing slat or pylon made of titanium, aluminum or cress metal; heat shields on an aircraft or other coated aircraft areas subject to engine efflux. A protective film provided by the silicon-based coating compositions disclosed herein over the base layer of paint or surface material of these surfaces is particularly useful to protect the surface and the substrate material from various external forces, particularly from the heat and high temperature, by greatly reducing radiant heat passing through the surface and the substrate material.

The cured coating is formed from any of the coating compositions described herein, and may be cured by any disclosed method, particularly by exposing the substrate coated with a coating composition to ambient conditions at room temperature for about 24 hours. Within the cured coating, silicon-based substituents are substantially completely reacted to form new covalent bonds to each other and to the substrate. As such, the coating is substantially free of Si—H bonds, which have been consumed in the curing process. Furthermore, if the coating composition contained substituents bearing vinyl groups, the C=C bonds are also consumed in the formation of new covalent bonds. Overall, the coating comprises a crosslinked polymer network comprising Si—O, Si—N, and Si—C bonds, especially when both the Si—N and the Si—O bonds are part of the same polymer network within the coating. Preferably, the coating is also substantially free of ammonia, free amines, or ammonium chloride. The crosslinked polymer provides a durable and hard coating, as described throughout this specification.

In summary, the silicon-based coatings and coating compositions describer herein serves to rejuvenate the surface and areas below it, thus returning to service obsolete or retired molds that could no longer hold a vacuum; and re-sealing the face side (functional side) of the tooling substrate (versus the back side) in a manner that allows the mold to hold a vacuum and allows the mold to create composite parts again. At the time of invention, no other sealer or mold restorer functioned to restore molds on the face side, meeting a long-felt and unmet need in the art. Conventional methods attempted remedy this problem (with very limited success) through use of sealers on the back side of the mold using materials such as urethane resins/coatings, such as truck bed lining material. The cured coatings described herein easily withstand the operating mold temperatures, and therefore do not degredate, unlike urethanes under the same operating conditions. Moreover, using the silicon-based coatings described herein do not alter the dimensional tolerance of the face side of the mold. The present silicon-based coatings provide significant cost benefits, because the material costs to rejuvenate molds is very reasonable, typically totaling less than 5% of the total value of the mold itself. The present silicon-based coatings also provide an on-going ability to continue to rejuvenate the molds. The silicon-based coating compositions are recoatable on previously cured silicon-based coating. The operators of the molds can continue to extend the life of the molds with periodic applications the silicon-based coatings.

Although the invention described herein is susceptible to various modifications and alternative iterations, specific embodiments thereof have been described in greater detail above. It should be understood, however, that the detailed description of the composition is not intended to limit the invention to the specific embodiments disclosed. Rather, it should be understood that the invention is intended to cover all modifications, equivalents, and alternatives falling within the spirit and scope of the invention as defined by the claim language.

Definitions

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight" and is used to describe the concentration of a particular substance in a mixture or solution.

As used herein, the term "ml/kg" designates milliliters of composition per kilogram of formula weight.

As used herein, the term "cure" or "curing" refers to a change in state, condition, and/or structure in a material that is usually, but not necessarily, induced by at least one variable, such as time, temperature, moisture, radiation, presence and quantity in such material of a catalyst or accelerator or the like. The terms cover partial as well as complete curing.

As used herein, the term "hardness" or "H" designates the property of a material that enables it to resist plastic deformation, usually by penetration. However, the term hardness may also refer to resistance to bending, scratching, abrasion or cutting. The usual method to achieve a hardness value is to measure the depth or area of an indentation left by an indenter of a specific shape, with a specific force applied for a specific time. There are four principal standard test methods for expressing the relationship between hardness and the size of the impression, these being Pencil Hardness ASTM D3363, Brinell, Vickers, and Rockwell. For practical and calibration reasons, each of these methods is divided into a range of scales, defined by a combination of applied load and indenter geometry.

As used herein, the term "coefficient of friction" (COF), also known as a "frictional coefficient" or "friction coefficient" or "kinetic coefficient of friction" and is an empirical measurement which describes the ratio of the force of friction between two bodies and the force pressing them together. The coefficient of friction depends on the materials used. When the coefficient of friction is measured by a standardized surface, the measurement is called "standardized coefficient of friction".

As used herein, the term "corrosion resistant agent" or variation thereof refers to additives in the coating on a surface which inhibit the corrosion of the surface substrate when it is exposed to air, heat, or corrosive environments for prolonged time periods.

As used herein, the term "monomer" refers to any chemical compound that is capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "blockpolymers." Monomers may belong to various chemical classes of molecules including organic, organometallic or inorganic molecules. The molecular weight of monomers may vary greatly between about 40 Daltons and 20,000 Daltons. However, especially when monomers comprise repetitive building blocks, monomers may have even higher molecular weights. Monomers may also include additional reactive groups.

Contemplated polymers may also comprise a wide range of functional or structural moieties, including aromatic systems, and halogenated groups. Furthermore, appropriate polymers may have many configurations, including a homopolymer, and a heteropolymer. Moreover, alternative polymers may have various forms, such as linear, branched, super-branched, or three-dimensional. The molecular weight of contemplated polymers spans a wide range, typically between 400 Daltons and 400,000 Daltons or more.

The compounds described herein have asymmetric centers. Compounds of the present disclosure containing an asymmetrically substituted atom may be isolated in optically active or racemic form. All chiral, diastereomeric, racemic forms and all geometric isomeric forms of a structure are intended, unless the specific stereochemistry or isomeric form is specifically indicated.

The term "acyl," as used herein alone or as part of another group, denotes the moiety formed by removal of the hydroxy group from the group COOH of an organic carboxylic acid, e.g., RC(O)—, wherein R is $R^1$, $R^1O$—, $R^1R^2N$—, or $R^1S$—, $R^1$ is hydrocarbyl, heterosubstituted hydrocarbyl, or heterocyclo, and $R^2$ is hydrogen, hydrocarbyl, or substituted hydrocarbyl.

The term "acyloxy," as used herein alone or as part of another group, denotes an acyl group as described above bonded through an oxygen linkage (O), e.g., RC(O)O— wherein R is as defined in connection with the term "acyl."

The term "allyl," as used herein not only refers to compound containing the simple allyl group ($CH_2$=CH—$CH_2$—), but also to compounds that contain substituted allyl groups or allyl groups forming part of a ring system.

The term "alkyl" as used herein describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alkenyl" as used herein describes groups which are preferably lower alkenyl containing from two to eight carbon atoms in the principal chain and up to 20 carbon atoms. They may be straight or branched chain or cyclic and include ethenyl, propenyl, isopropenyl, butenyl, isobutenyl, hexenyl, and the like.

The term "alkynyl" as used herein describes groups which are preferably lower alkynyl containing from two to eight carbon atoms in the principal chain and up to 20 carbon atoms. They may be straight or branched chain and include ethynyl, propynyl, butynyl, isobutynyl, hexynyl, and the like.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The terms "aryl" or "Ar" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The terms "carbocyclo" or "carbocyclic" as used herein alone or as part of another group denote optionally substituted, aromatic or non-aromatic, homocyclic ring or ring system in which all of the atoms in the ring are carbon, with preferably 5 or 6 carbon atoms in each ring. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "halogen" or "halo" as used herein alone or as part of another group refer to chlorine, bromine, fluorine, and iodine.

The term "heteroatom" refers to atoms other than carbon and hydrogen.

The term "heteroaromatic" as used herein alone or as part of another group denotes optionally substituted aromatic groups having at least one heteroatom in at least one ring, and preferably 5 or 6 atoms in each ring. The heteroaromatic group preferably has 1 or 2 oxygen atoms and/or 1 to 4 nitrogen atoms in the ring, and is bonded to the remainder of the molecule through a carbon. Exemplary groups include furyl, benzofuryl, oxazolyl, isoxazolyl, oxadiazolyl, benzoxazolyl, benzoxadiazolyl, pyrrolyl, pyrazolyl, imidazolyl, triazolyl, tetrazolyl, pyridyl, pyrimidyl, pyrazinyl, pyridazinyl, indolyl, isoindolyl, indolizinyl, benzimidazolyl, indazolyl, benzotriazolyl, tetrazolopyridazinyl, carbazolyl, purinyl, quinolinyl, isoquinolinyl, imidazopyridyl, and the like. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom. Exemplary heterocyclo groups include heteroaromatics as described above. Exemplary substituents include one or more of the following groups: hydrocarbyl, substituted hydrocarbyl, alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The term "protecting group" as used herein denotes a group capable of protecting a particular moiety, wherein the protecting group may be removed, subsequent to the reaction for which the protection is employed, without disturbing the remainder of the molecule. Where the moiety is an oxygen atom (and hence, forming a protected hydroxy), exemplary protecting groups include ethers (e.g., allyl, triphenylmethyl (trityl or Tr), p-methoxybenzyl (PMB), p-methoxyphenyl (PMP)), acetals (e.g., methoxymethyl (MOM), β-methoxyethoxymethyl (MEM), tetrahydropyranyl (THP), ethoxy ethyl (EE), methylthiomethyl (MTM), 2-methoxy-2-propyl (MOP), 2-trimethylsilylethoxymethyl (SEM)), esters (e.g., benzoate (Bz), allyl carbonate, 2,2,2-trichloroethyl carbonate (Troc), 2-trimethylsilylethyl carbonate), silyl ethers (e.g., trimethylsilyl (TMS), triethylsilyl (TES), triisopropylsilyl (TIPS), triphenylsilyl (TPS), t-butyldimethylsilyl (TBDMS), t-butyldiphenylsilyl (TBDPS) and the like. When the moiety is an nitrogen atom (and hence, forming a protecting amine) exemplary protecting groups include benzyl, p-methoxyphenyl (PMP), 3,4-dimethoxybenxyl (PMB)), n-silyl groups, esters (e.g., benzoate (Bz), carbonyl (e.g. p-methoxybenzyl carbonyl (Moz), tert-butyloxycarbonyl (BOC), 9-fluorenylmethyloxycarbonyl (FMOC)), acetyl, carbamates, n-silyl groups and the like. A variety of protecting groups and the synthesis thereof may be found in "Protective Groups in Organic Synthesis" by T. W. Greene and P. G. M. Wuts, John Wiley & Sons, 1999.

The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorous, boron, or a halogen atom, and moieties in which the carbon chain comprises additional substituents. These substituents include alkyl, alkoxy, acyl, acyloxy, alkenyl, alkenoxy, aryl, aryloxy, amino, amido, acetal, carbamyl, carbocyclo, cyano, ester, ether, halogen, heterocyclo, hydroxy, keto, ketal, phospho, nitro, and thio.

When introducing elements of the present disclosure or the exemplary embodiments(s) thereof, the articles "a", "an", "the" and "said" are intended to mean that there are one or more of the elements. The terms "comprising", "including" and "having" are intended to be inclusive and mean that there may be additional elements other than the listed elements.

Unless otherwise defined, all technical and scientific terms used herein have the same meaning as is commonly understood by one of skill in the art to which this invention belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

The following examples are intended to further illustrate and explain the present invention. The invention, therefore, should not be limited to any of the details in these examples.

EXAMPLES

Example 1—Preparation of Resin Systems for Making Silicon-Based Coating Compositions The silicon-based coating formulations provided herein were formed from two or more different resin systems chosen from, what was known as A-Resin, B-Resin, C-Resin, and any combinations thereof. The A-Resin was made according to the formulation provided in Table 1. The A-Resin was purchased from KiON Defense Technologies (Huntingdon Valley, PA), and it was sold as KDT HTA® 1500 Fast™, an air curable liquid polysilazane based coating resin (8.9 lbs/Gallon).

TABLE 1

A-Resin formulation

| Ingredient | CAS NO. | Amount (w/w) Appx. |
|---|---|---|
| Polysilazane | CAS# 475645-84-2 | <99% (w/w) |
| Cyclosilazane | CAS# 503590-70-3 | <5% (w/w) |
| n-Butyl acetate | CAS# 123-86-4 | <3% (w/w) |
| (or tert-Butyl acetate) | (CAS# 540-88-5) | |
| Polysiloxane | CAS# 9011-19-2 | <50% (w/w) |

The B-Resin was made according to the formulation provided in Table 2. The B-Resin was purchased from Genesee Polymers Corp. (Burton, MI), and it was sold as Dimethyl Silicone Fluids G-10 products (8.0 lbs/Gallon).

TABLE 2

B-Resin formulation

| Ingredient | CAS NO. | Amount (w/w) Appx. |
|---|---|---|
| Polydimethylsiloxane fluid | CAS# 63148-62-9 | <5% (w/w) |
| Isopropyl acetate | CAS# 108-24-4 | <98% (w/w) |

The C-Resin was made according to the formulation provided in Table 3. The C-Resins was purchased from Kadko, Inc. (Beech Grove, Indiana), and it was sold as a polysilazane based KADKLAD R2X3™ product.

TABLE 3

C-Resin formulation

| Ingredient | CAS NO. | Amount (w/w) Appx. |
|---|---|---|
| Polysilane | CAS# 475645-84-2 | <8% (w/w) |
| Amyl Acetate Blend | CAS# 628-63-7 | <98% |
| Isopropyl acetate | CAS# 108-21-4 | 25-35% |
| Isoparaffinic hydrocarbon | CAS# 64741-66-8 | 50-60% |
| Aliphatic hydrocarbon | CAS# 64742-47-8 | 5-10% |
| Acetate ester | CAS# 108419-34-7 | 1-5% |

The A-, B-, and C-Resin systems were then used in appropriate amount for different mold release formulations, as such a mix of polysilazane, polysiloxane and/or polysilane and acetate solvent was used to produce formulations of coating products with various desired properties as described below.

Characteristics of the coating products using the formulations provided herein included extreme release, long lasting, non-transferable, clear, thin, light, slick, hard, high pressure resistant, high temperature resistant, chemical resistant, and microbial resistant.

Example 2-Mold Release Coat Formulation DT-6025

A mold release silicon-based coating formulation was made according to the formulation provided in Table 4. The base resin mixture of this particular mold release coat was formed by mixing the A-, B- and C-Resins in the amount listed below. The formulation was to be used to coat the face of a porous composite mold surface.

TABLE 4

Mold Release Silicon-Based Coating DT-6025 Composition

| INGREDIENT | AMOUNT (w/w) |
|---|---|
| 1. Base Resin Mixture | |
| A-Resin: | 8% (w/w) |
| B-Resin: | 8% (w/w) |
| C-Resin: | 73% (w/w) |
| 2. Solvent- | |
| tert-Butyl Acetate CAS# 540-88-5 | 6% (w/w) |
| High-purity Synthetic Isoparaffin (Isopar ™-G) | 5% (w/w) |
| Total = | 100% (w/w) |

To prepare 10 gallons of DT-6025 coating composition, B-Resin and C-Resin were separately agitated, then 0.8 gallons B-Resin were mixed with 7.3 gallons C-Resin blended using a mix paddle for a few minutes to obtain a uniform mixture. Since both the B- and C-Resin were very fluid, no extreme agitation was required. Next, 0.8 gallons of A-Resin was added to the B-Resin/C-Resin mixture, followed by 0.6 gallons of tert-butyl acetate and 0.5 gallons of high-purity synthetic isoparaffin. The complete mixture was thoroughly mixed by stir paddle until a homogenous or uniform blend was formed. The stir paddle was rotated at about 500 rpm for about five minutes. The finished formulated resin system was then filtered through a 120-mesh paint filter (U.S. standard sieve size) such that no particles or debris were left within the coating mixture. This filtered resin system was then wiped onto a porous mold surface. The coating had a thickness of about 1 to 2 µm. The theoretical coverage of this formulation is 3,000 ft²/gallon for a thickness of 0.5 µm. Pre-conditioning of the mold surface can include, for example, drying, cleaning, and removing contamination from the surface.

After application, the coating was allowed to cure under ambient conditions at room temperature for 25 minutes, after which it was dry to touch, achieving approximately 50% of cured film property values. After an additional 24 hours, the finished coating had achieved full property values. Using comparative tests, including chemical resistance, release, ease of part removal, and tool clean-up, the resultant coating displayed have superior release properties compared to other industry standard release coatings, including better release and easier tool cleanup, among others. The resultant coating was 100% non-transferable to finished composite part, resulting in reduced mold wear and maintenance, autoclave pressure- and heat durability, pull-resistant, recoatability, crystal clarity, long-term mechanical durable, and ultrathinness. When tested according to ASTM D3363, the mold release coating had a hardness of 5H or above.

Example 3-Mold Release Coating Formulation DT-6060

A mold release silicon-based coating formulation was made according to the formulation provided in Table 5. The mold release coat was formed by mixing the B- and C-Resins in the amount listed below. The formulation was to be used to coat the face of a metal mold surface.

TABLE 5

Mold Release Silicon-Based Coating DT-6060 Composition

| INGREDIENT | AMOUNT (w/w) |
|---|---|
| 1. Base Resin Mixture | |
| B-Resin: | 50% (w/w) |
| C-Resin: | 50% (w/w) |
| 2. Solvent- | |
| tert-Butyl Acetate CAS# 540-88-5 | 0% (w/w) |
| Total = | 100% (w/w) |

To prepare 10 gallons of DT-6060 coating composition, 5 gallons of B-Resin and 5 gallons C-Resin were thoroughly mixed by stir paddle until a homogenous or uniform blend was formed. The stir paddle was rotated at about 500 rpm for about five minutes. The finished formulated resin system was then filtered through a 120-mesh paint filter (U.S. standard sieve size) such that no particles or debris were left within the coating mixture. This filtered resin system was then wipe-coated onto a metal mold surface. The applied coating had a thickness of about 1 to 3 µm. The theoretical coverage of this formulation is 5,000 ft²/gallon for a thickness of 0.2 µm. Pre-conditioning of the substrate surface can include, for example, drying, cleaning, and removing contamination from the surface.

After application, the coating was allowed to cure under ambient conditions at room temperature for 25 minutes, after which it was dry to touch, achieving approximately 50% of cured film property values. After an additional 24 hours, the finished coating with full property values. The resultant coating was 100% non-transferable to finished composite part, helped to reduce mold wear. Using comparative tests, including chemical resistance, release, ease of part removal and tool clean-up, the resultant coating was shown to possess superior release properties, when compared to other industry standard release coatings, such as better release and easier tool cleanup among others. The resultant coating was 100% non-transferable to finished composite part, resulting in reduced mold wear and maintenance, autoclave pressure- and heat durability, pull-resistant, recoatability, crystal clarity, long-term mechanical durable, and ultrathinness. When tested according to ASTM D3363, the mold release coating had a hardness up to 8H.

Example 4-Mold Release Coating Formulation DT-405

A mold release silicon-based coating formulation was made according to the formulation provided in Table 5. The base resin mixture of this particular mold release coat was formed by mixing the A- and C-Resins in the amount listed below. The formulation was to be used to coat the face of a porous composite mold surface.

TABLE 5

Mold Release Silicon-Based Coating DT-405 Composition

| INGREDIENT | AMOUNT (w/w) |
|---|---|
| 1. Base Resin Mixture | |
| A-Resin: | 50% (w/w) |
| C-Resin: | 25% (w/w) |
| 2. Solvent- | |
| tert-Butyl Acetate CAS# 540-88-5 | 25% (w/w) |
| High-purity Synthetic Isoparaffin (Isopar ™-G) | 0% (w/w) |
| Total | = 100% (w/w) |

To prepare 10 gallons of DT-405 coating composition, 2.5 gallons of C-Resin was agitated and then combined with 5 gallons A-Resin and 2.5 gallons tert-butyl acetate using a mix paddle until a homogenous or uniform blend was formed. The stir paddle was rotated at about 500 rpm for about five minutes. The finished formulated resin system was then filtered through a 120-mesh paint filter (U.S. standard sieve size) such that no particles or debris were left within the coating mixture. This filtered resin system was then wiped onto a porous mold surface. The coating had a thickness of about 10 µm to about 38 µm. The theoretical coverage of this formulation is 1800 ft²/gallon for a thickness of 25 µm. Pre-conditioning of the mold surface included, for example, drying, cleaning, and removing contamination from the surface.

After application, the coating was allowed to cure under ambient conditions at room temperature for 25 minutes, after which it was dry to touch, achieving approximately 50% of cured film property values. After an additional 24 hours, the finished coating with full property values. Using comparative tests, including chemical resistance, release, ease of part removal and tool clean-up, the resultant coating was shown to possess superior release properties, when compared to other industry standard release coatings, such as better release and easier tool cleanup among others. The resultant coating was 100% non-transferable to finished composite part, resulting in reduced mold wear and maintenance, autoclave pressure- and heat durability, pull-resistant, recoatability, crystal clarity, long-term mechanical durable, and ultrathinness. When tested according to ASTM D3363, the mold release coating had a hardness of 6H to 9H.

Example 5-Mold Release Coating Formulation DT-201

A mold release silicon-based coating formulation was made according to the formulation provided in Table 6. The base resin mixture of this particular mold release coat was formed by mixing the A-, B- and C-Resins in the amount listed below. The formulation was to be used to coat the face of a porous composite mold surface.

TABLE 6

Mold Release Silicon-Based Coating DT-201 Composition

| INGREDIENT | AMOUNT (w/w) |
|---|---|
| 1. Base Resin Mixture | |
| A-Resin: | 66% (w/w) |
| B-Resin: | 17% (w/w) |
| C-Resin: | 17% (w/w) |
| 2. Solvent- | |
| tert-Butyl Acetate CAS# 540-88-5 | 0% (w/w) |
| High-purity Synthetic Isoparaffin (Isopar ™-G) | 0% (w/w) |
| Total | = 100% (w/w) |

To prepare 10 gallons of DT-201 coating composition, the B-Resin and C-Resin were separately agitated. After agitation, 1.7 gallons of B-Resin and 1.7 gallons of C-Resin were blended using a mix paddle for a few minutes to obtain a uniform mixture. Since both the B- and C-Resin were very fluid, no extreme agitation was required. Next, 6.6 gallons or A-resin were added to the mixture of B- and C-Resins and was thoroughly mixed by stir paddle until a homogenous or uniform blend was formed. The stir paddle was rotated at about 500 rpm for about five minutes. The finished formulated resin system was then filtered through a 120-mesh paint filter (U.S. standard sieve size) such that no particles or debris were left within the coating mixture. This filtered resin system was then wiped onto a porous mold surface. The coating had a thickness of about 10 µm to about 38 µm. The theoretical coverage of this formulation is 1500 ft²/gallon for a thickness of 25 µm. Pre-conditioning of the mold surface included, for example, drying, cleaning, and removing contamination from the surface.

After application, the coating was allowed to cure under ambient conditions at room temperature for 25 minutes, after which it was dry to touch, achieving approximately 50% of cured film property values. After an additional 24 hours, the finished coating had full property values. Using comparative tests, including chemical resistance, release, ease of part removal and tool clean-up, the resultant coating was shown to possess superior release properties, when compared to other industry standard release coatings, such as better release and easier tool cleanup among others. The resultant coating was 100% non-transferable to finished composite part, resulting in reduced mold wear and maintenance, autoclave pressure- and heat durability, pull-resistant, recoatability, crystal clarity, long-term mechanical durable, and ultrathinness. When tested according to ASTM D3363, the mold release coating had a hardness of 5H or above.

Example 6-Mold Release Coating Formulation DT-420

A mold release silicon-based coating formulation was made according to the formulation provided in Table 7. The base resin mixture of this particular mold release coat was formed by mixing the A-, B- and C-Resins in the amount listed below. The formulation was to be used to coat the face of a porous composite mold surface.

TABLE 7

Mold Release Silicon-based Coating DT-420 Composition

| INGREDIENT | AMOUNT (w/w) |
|---|---|
| 1. Base Resin Mixture | |
| A-Resin: | 9% (w/w) |
| B-Resin: | 8% (w/w) |
| C-Resin: | 83% (w/w) |
| 2. Solvent- | |
| tert-Butyl Acetate CAS# 540-88-5 | 0% (w/w) |
| High-purity Synthetic Isoparaffin (Isopar™-G) | 0% (w/w) |
| | Total = 100% (w/w) |

To prepare 10 gallons of DT-420 coating composition, the B-Resin and C-Resin were separately agitated, then 0.8 gallons of B-Resin were mixed with 8.3 gallons of C-Resin using a mix paddle for a few minutes to obtain a uniform mixture. Since both the B- and C-Resin were very fluid, no extreme agitation was required. Next, 0.9 gallons of A-Resin were added to the B-Resin/C-Resin mixture. The mixture was thoroughly mixed by stir paddle until a homogenous or uniform blend was formed. The stir paddle was rotated at about 500 rpm for about five minutes. The finished formulated resin system was then filtered through a 120-mesh paint filter (U.S. standard sieve size) such that no particles or debris were left within the coating mixture. This filtered resin system was then wiped onto a porous mold surface. The coating had a thickness of about 5 to 9 μm. The theoretical coverage of this formulation is 2200 ft$^2$/gallon for a thickness of 5 μm. Pre-conditioning of the mold surface included, for example, drying, cleaning, and removing contamination from the surface.

After application, the coating was allowed to cure under ambient conditions at room temperature for 25 minutes, after which it was dry to touch, achieving approximately 50% of cured film property values. After an additional 24 hours, the finished coating had full property values. Using comparative tests, including chemical resistance, release, ease of part removal and tool clean-up, the resultant coating was shown to possess superior release properties, when compared to other industry standard release coatings, such as better release and easier tool cleanup among others. The resultant coating was 100% non-transferable to finished composite part, resulting in reduced mold wear and maintenance, autoclave pressure- and heat durability, pull-resistant, recoatability, crystal clarity, long-term mechanical durable, and ultrathinness. When tested according to ASTM D3363, the mold release coating had a hardness of 6H to 9H.

Example 7—Differential Thermal Analysis of Mold Release Coatings

Differential thermal analysis (DTA) of the tested cured coatings indicated complete reaction of the resin precursors, giving no indication of free silicon in the coating. This feature is especially important for mold release coatings. Free silicon may transfer to the surface of a molded part, leading to issues with adhesion for subsequent primer and finish coatings on the molded article. The lack of free silicon in present mold release coatings addresses a long-standing issue with the current technology. Further, no weight loss of the cured coating was observed at the tested temperatures.

Two mold release coatings, DT-6060 and DT-420, were prepared as described above in Examples 3 and 6, respectively. DTA was conducted on an aluminum test panel from a temperature of 25° C. to 315° C. with a step increment of 25° C./minutes. Twelve panels were prepared for each coating and the results averaged. The relative derivative weight (%) of each release coating was plotted against the temperature.

Referring to FIG. 1, the minimal weight loss below 200° C. can be attributed to the loss of residual solvent in the coating and the loss of moisture adsorbed to the surface from the atmosphere. Free silicon would have reacted at temperatures between 240° C. and 300° C., which would cause a significant decrease of mass due to the loss of low molecular weight components. However, this decrease did not occur for either DT-6060 or for DT-420. No loss of low molecular weight components was detected in the temperature range in the DTA. Therefore, both coating materials were virtually free of unbound silicon after curing process.

Example 8—Comparison of DT-6060 with G-Shield™ Coating Product Using FTIR Analysis The Fourier transform infrared (FTIR) spectroscopic analysis distinguished DT-6060 coatings from G-Shield™ coatings (also known as "Clariant TutoProm") in at least three significant ways. First, unlike G-Shield™, DT-6060 coatings did not contain ammonia, free amines or ammonium salts, which were byproducts of polysilazane synthesis and are environmentally toxic. Second, also unlike G-Shield™, DT-6060 coatings did not contain unreacted silanes, indicating a superiorly crosslinked polymer network in the coating. Third, DT-6060 coatings contained Si—O and Si—C, indicating a polysiloxane components within the coating which is absent from the G-Shield™ coating.

DT-6060 coatings were prepared as described above in Example 3. G-Shield™ is a commercially available product manufactured by KiON Specialty Polymers (Charlotte, N.C.), a division of Clariant Corporation and a subsidiary of AZ Electronics. G-Shield™ is advertised as a clear, ultrathin, antifouling, protective finish coating, containing a proprietary polysilazane. DT-6060 and G-Shield™ coatings were prepared on an aluminum substrate. Samples were analyzed on Nicholet 380 Fourier transform infrared spectrometer. Measurements were taken in attenuated total reflectance (ATR) mode with a resolution of 4.000 cm−1 and as an average of 128 scans.

Figure 2:
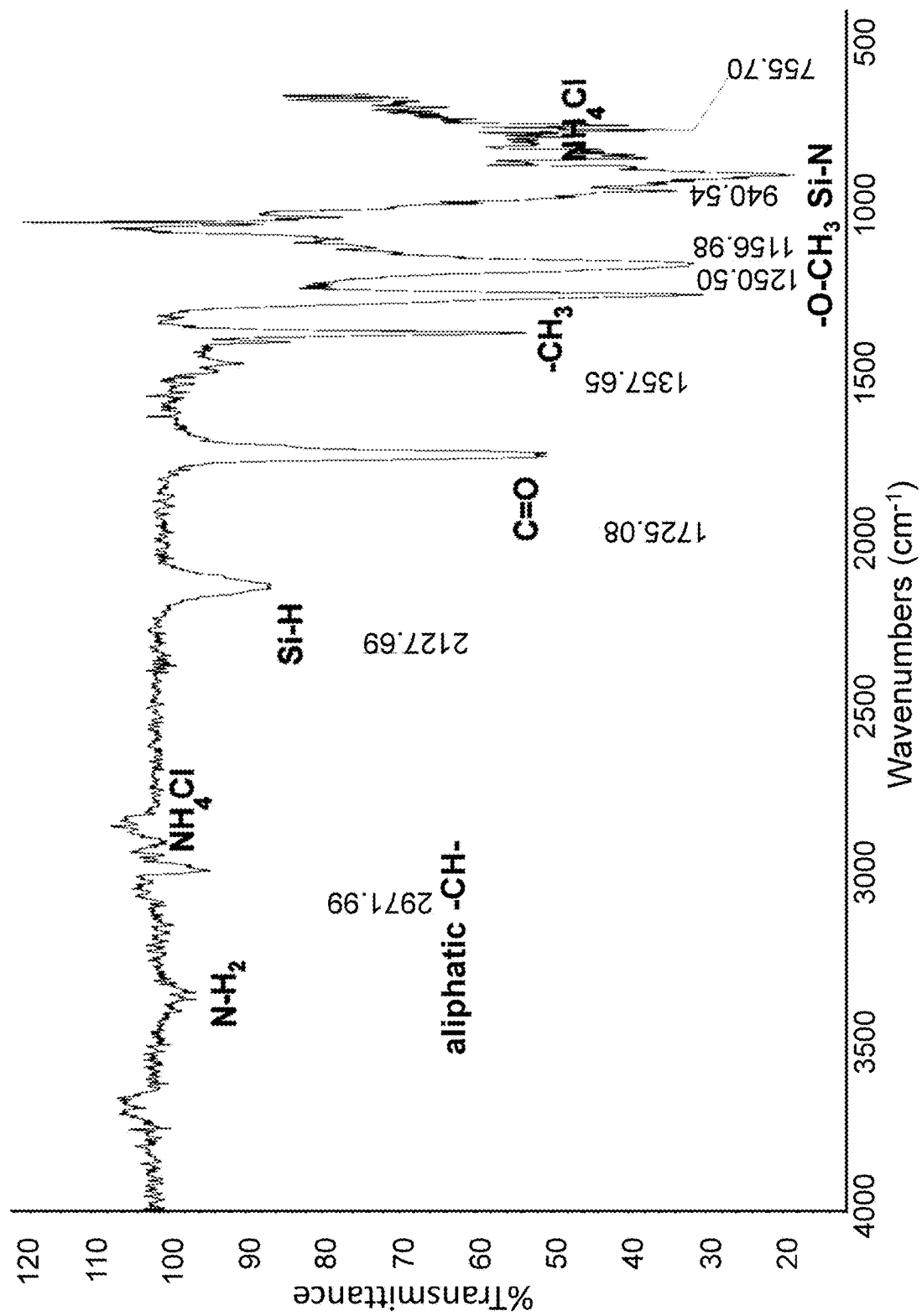
FIG. 2 depicts the Fourier transform infrared (FTIR) spectrum of a G-Shield™ (also known as "Clariant Tuto-Prom") coating sample.

FIG. 2 is an FTIR spectrum for the G-Shield™ coating. The N—H stretch around 3300 cm$^{-1}$ indicates free ammonia, and the bands around 2800 cm$^{-1}$ and 800 cm$^{-1}$ indicate the presence of ammonium chloride in the coating. It is also highly probable, based on the FTIR spectrum, that this sample contains unreacted amines. The G-Shield™ coating further contains unreacted silanes, as indicated by the Si—H stretch at 2128 cm$^{-1}$. The presence of free silanes indicates that the coatings are not fully polymerized and have not form a fully interconnected polymer network. Problems would also arise if G-Shield™ were used in as a mold release coating, because these silanes would transfer to the molded article, potentially causing problems with coating the molded article in upstream processing. While Si—N bonds are quite prevalent, as shown by the strong band at about 900 cm$^{-1}$, the G-Shield™ coating does not contain any Si—O, Si—C, or vinylic bonds.

Figure 3:
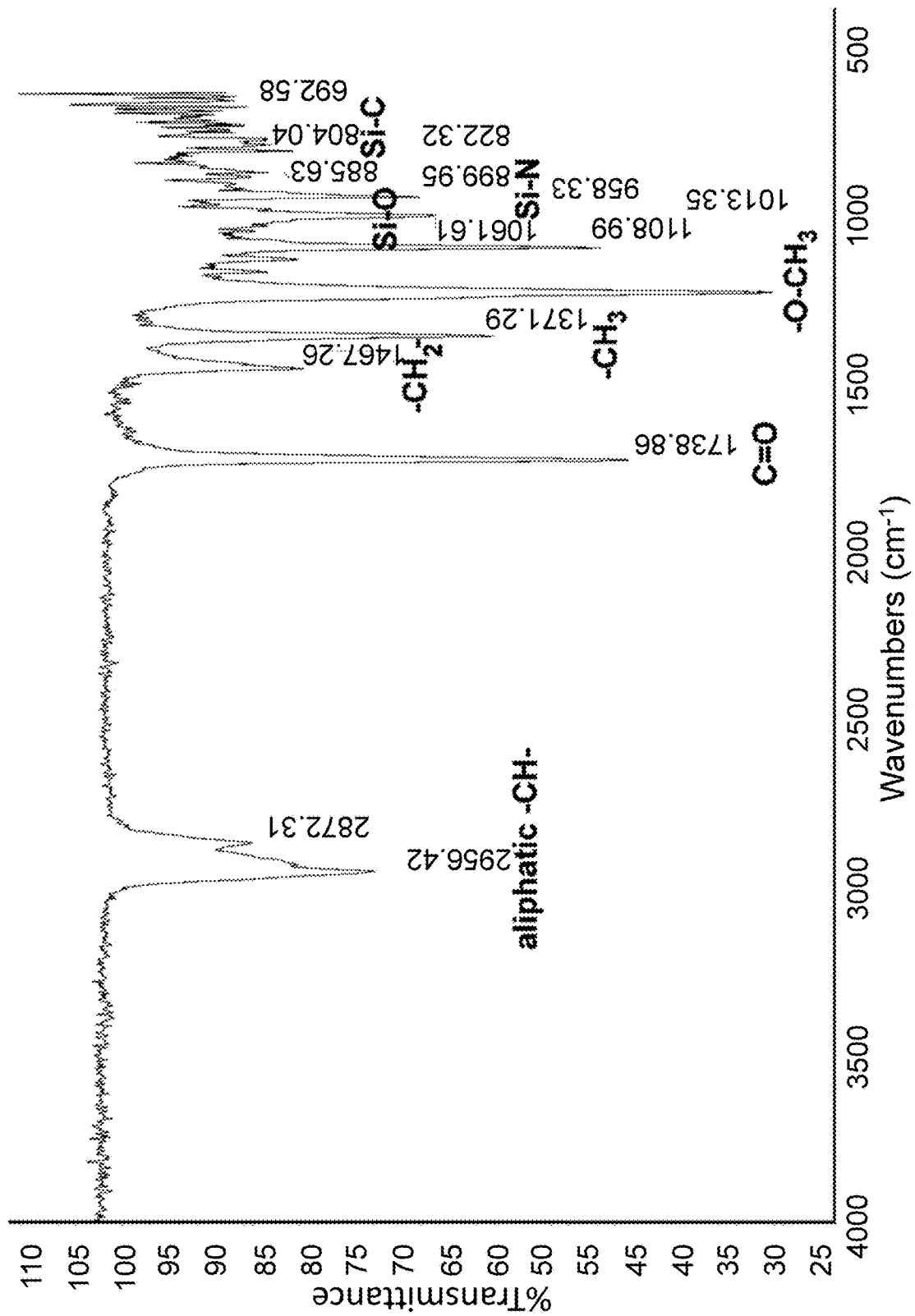
FIG. 3 depicts the FTIR spectrum of a DT-6060 coating sample.

FIG. 3 is an FTIR spectrum for the DT-6060 coating formulated in this invention. The bands at 3300 cm$^{-1}$, 2800 cm$^{-1}$, and 800 cm$^{-1}$ are absent, indicating no ammonia, free amines, or ammonium chloride in the coating. The Si—O band at 1062 cm$^{-1}$ and Si—C band at 822 cm$^{-1}$ are consistent with the presence of siloxane-containing dimethyl fluid (—Si—(—O—Si—)—$_n$) in the DT-6060 coating formulation. Further, the Si—N spectral region (1000-850 cm$^{-1}$) is significantly broadened compared with the same region of spectrum for the G-Shield™ coating, indicating a higher degree of networking within the DT-6060 coating than in the G-Shield™ coating. The Si—O spectral region (1180-1140 cm$^{-1}$) is also broadened, indicating that both the Si—N and the Si—O bonds are part of the same polymer network within the DT-6060 coating. Moreover, DT-6060 does not contain any unreacted silanes, as indicated by the absence of the Si—H stretch around 2130 cm$^{-1}$, suggesting that cured coating is substantially completely reacted.

Based on the analysis of the FTIR spectra, the G-Shield™ coating differs significantly from DT-6060. First, unlike G-Shield™, the DT-6060 coating does not contain ammonia, free amines or ammonium salts, which are environmentally toxic. Second, the silanes in DT-6060 have completely reacted. Because there are no free Si—H groups, the DT-6060 coating composition formed a significantly more interconnected network during curing than did the G-Shield™ coating composition. The peak width of the Si—O and Si—N bands also indicates the extent of the polymer network in the DT-6060 coating is greater compared to that of the G-Shield™. This advantage is manifested in a shorter drying/curing time for DT-6060 coating compared to G-Shield™ coating. The lack of free silanes also improves the non-transferability of the DT-6060 coatings, which is especially important for mold release applications. Third, because DT-6060 contains Si—C and Si—O bonds which are not in the G-Shield™ coating material, the two products have different chemical structures, especially the structure of the crosslinked network of the silicon-based polymers.

Example 9—FTIR Analysis of DT-420, DT-405 and DT-201

Samples of DT-420, DT-405, and DT-201 coatings were also prepared according to the present invention and analyzed using FTIR spectroscopy. Coatings for DT-420 were prepared according to Example 6 above, for DT-405 according to Example 4 above, and for DT-201 according to Example 5 above. The DT-420, DT-405, and DT-201 coatings were each prepared on an aluminum substrate. Samples were analyzed on a Nicolet 380 Fourier transform infrared spectrometer. Measurements were taken in ATR mode with a resolution of 4.000 cm−1 and as an average of 128 scans. Spectra for the DT-420, DT-405, and DT-201 coating samples are shown at FIGS. 4-6, respectively.

Figure 4:
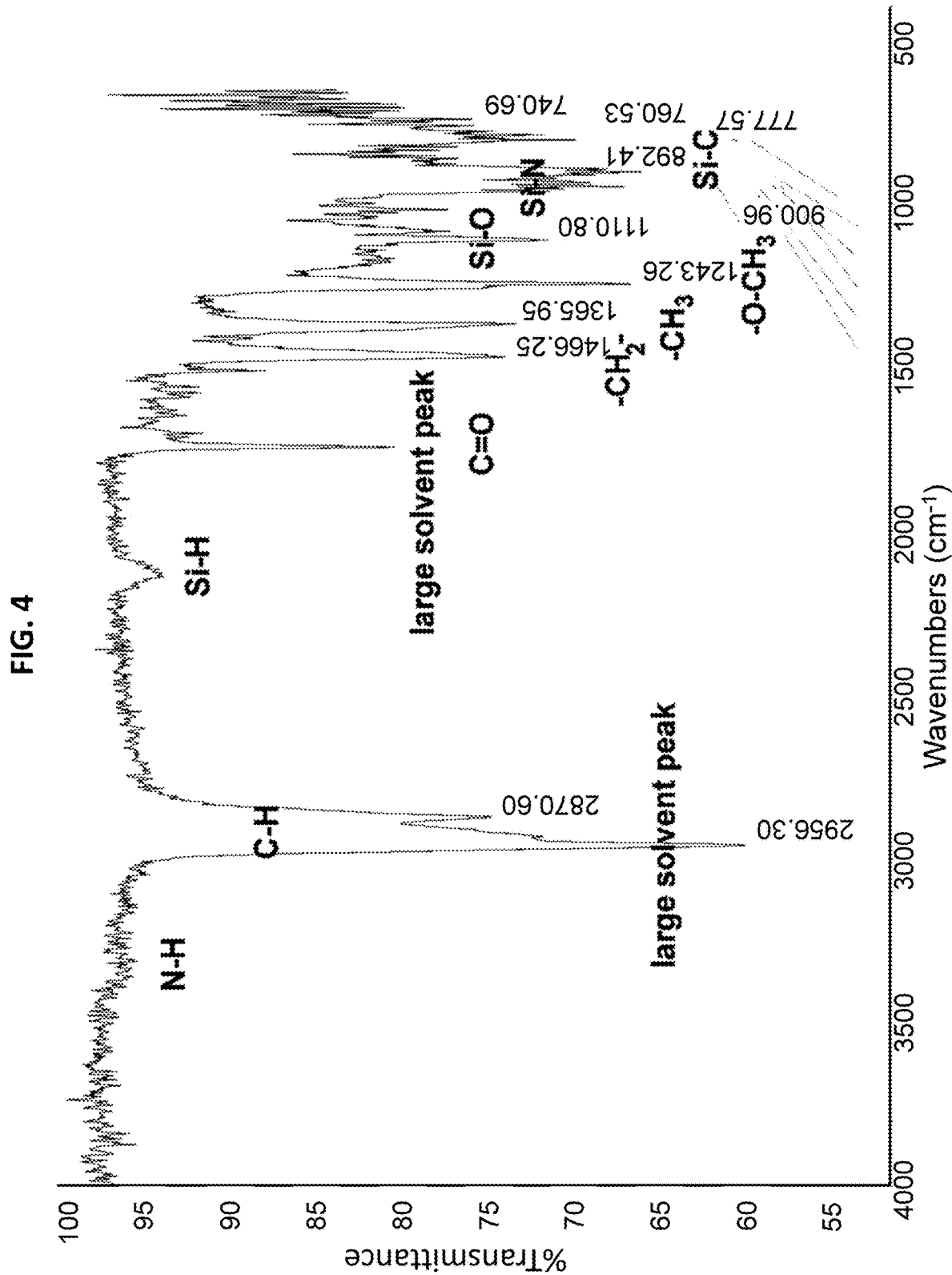
FIG. 4 depicts the FTIR spectrum of a DT-420 coating sample.
Figure 5:
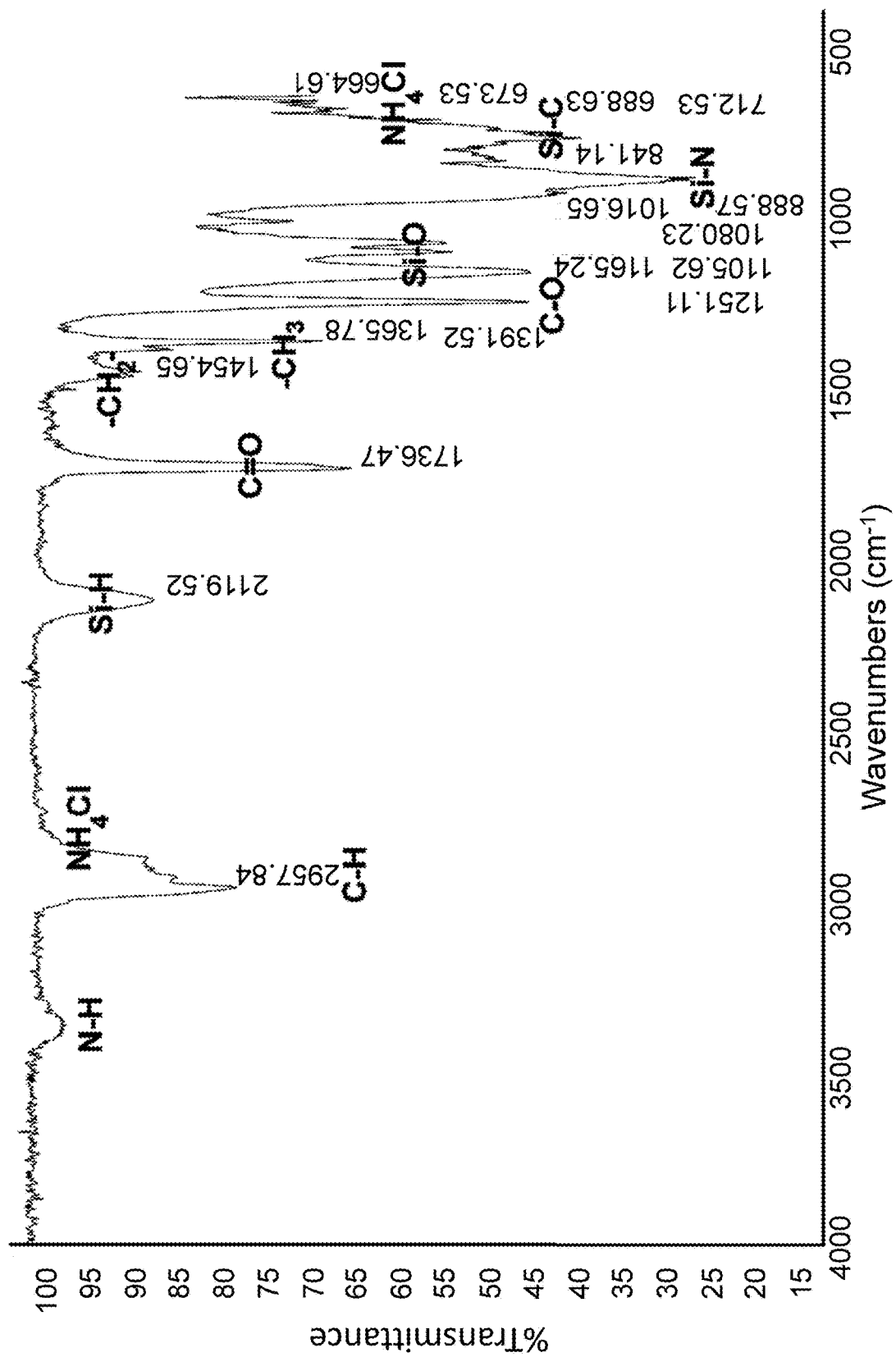
FIG. 5 depicts the FTIR spectrum of a DT-405 coating sample.
Figure 6:
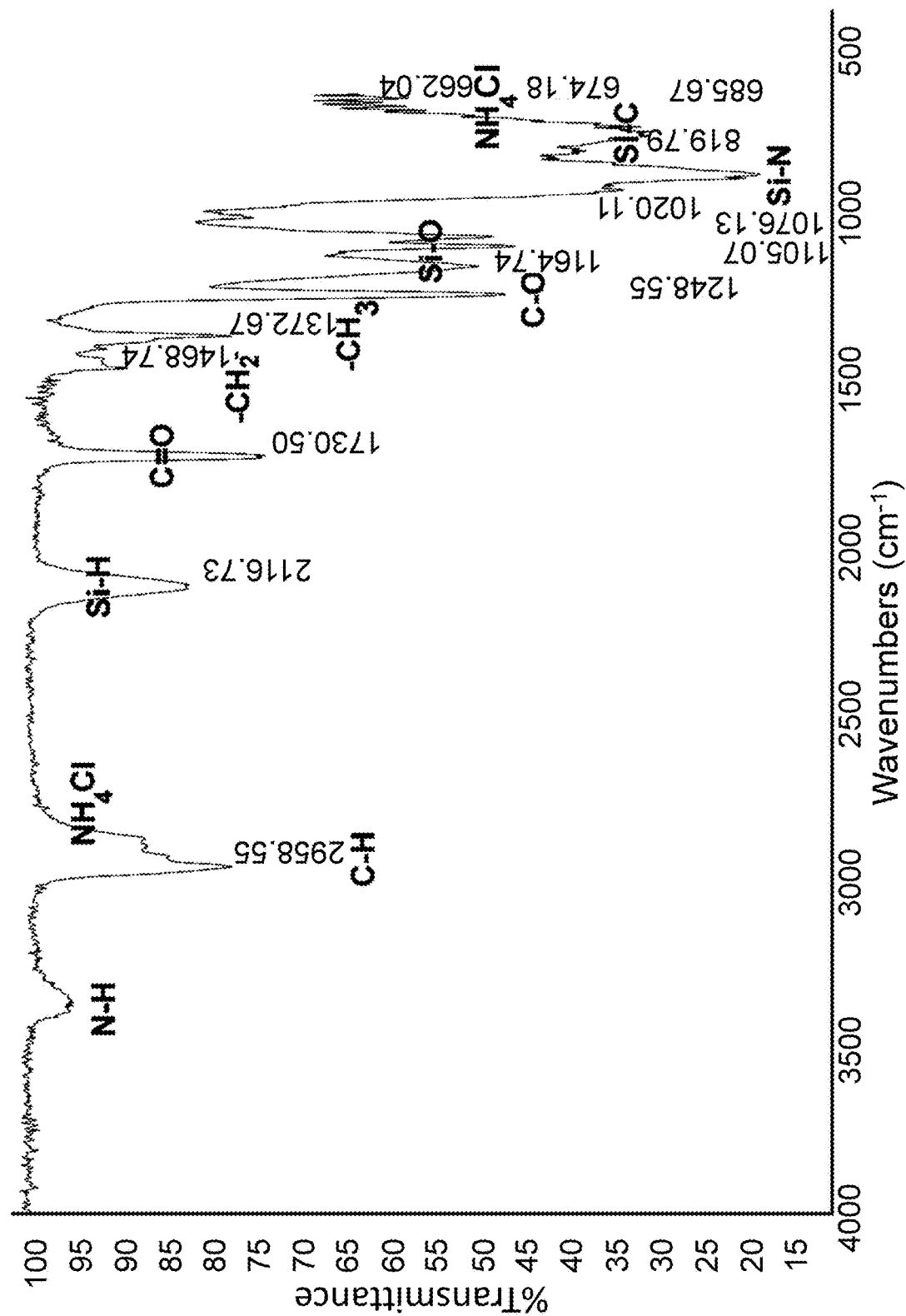
FIG. 6 depicts the FTIR spectrum of a DT-201 coating sample.

As shown in FIGS. 4-6, these coatings present Si—C bands at 840 cm$^{-1}$ and Si—O bands at about 1165 cm$^{-1}$. As discussed above in Example 8, the G-Shield™ coating does not containing Si—C or Si—O bonds, meaning that the DT coatings are have different chemical structures than the G-Shield™ coatings. Further, the Si—N spectral region (1000-850 cm$^{-1}$) of the DT materials is significantly broadened compared with the same region of spectrum for the G-Shield™ coating, indicating a superior degree of networking within the DT materials. The Si—O spectral region (1180-1140 cm$^{-1}$) in the DT coatings is also broadened, indicating that both the Si—N and the Si—O bonds are part of the same polymer network within the coating. The FTIR for DT-405 and DT-201 coatings (FIGS. 5 and 6) show bands for ammonia or at free amine and for ammonium.

In summary, the DT-420, DT-405, and DT-201 coatings were structurally distinct from the G-Shield™ coating. Like the DT-6060 coating, the DT-420, DT-405, and DT-201 coatings comprised a polymer network of Si—C and Si—O bonds, which G-Shield™ lacks. Moreover, the Si—O and Si—N bonds of the DT coatings are part of the same polymer network, which is not possible for G-Shield™ coating, because it does not comprise Si—O bonds.

Example 10—Comparison of KDT HTA® 1500 Resin to DT Coatings Using FTIR

KDT HTA® 1500 Resin is an ambient cure coating resin manufactured by KiON Defense Technologies, Inc. (Huntingdon Valley, PA) and provides the polysilazane constituent in the coating compositions of the present invention, as described above in Example 1. FTIR allows for comparison of the functional groups in the cured DT coatings to the functional groups of the uncured KDT HTA® 1500 Resin starting material. Overall, the FTIR spectrum shows that the KDT HTA® 1500 Resin is structurally distinct from the DT coatings described herein. KDT HTA® 1500 contains a relatively large amount of unreacted Si—H bonds, as well as unreacted vinyl and amine functional groups.

Figure 7:
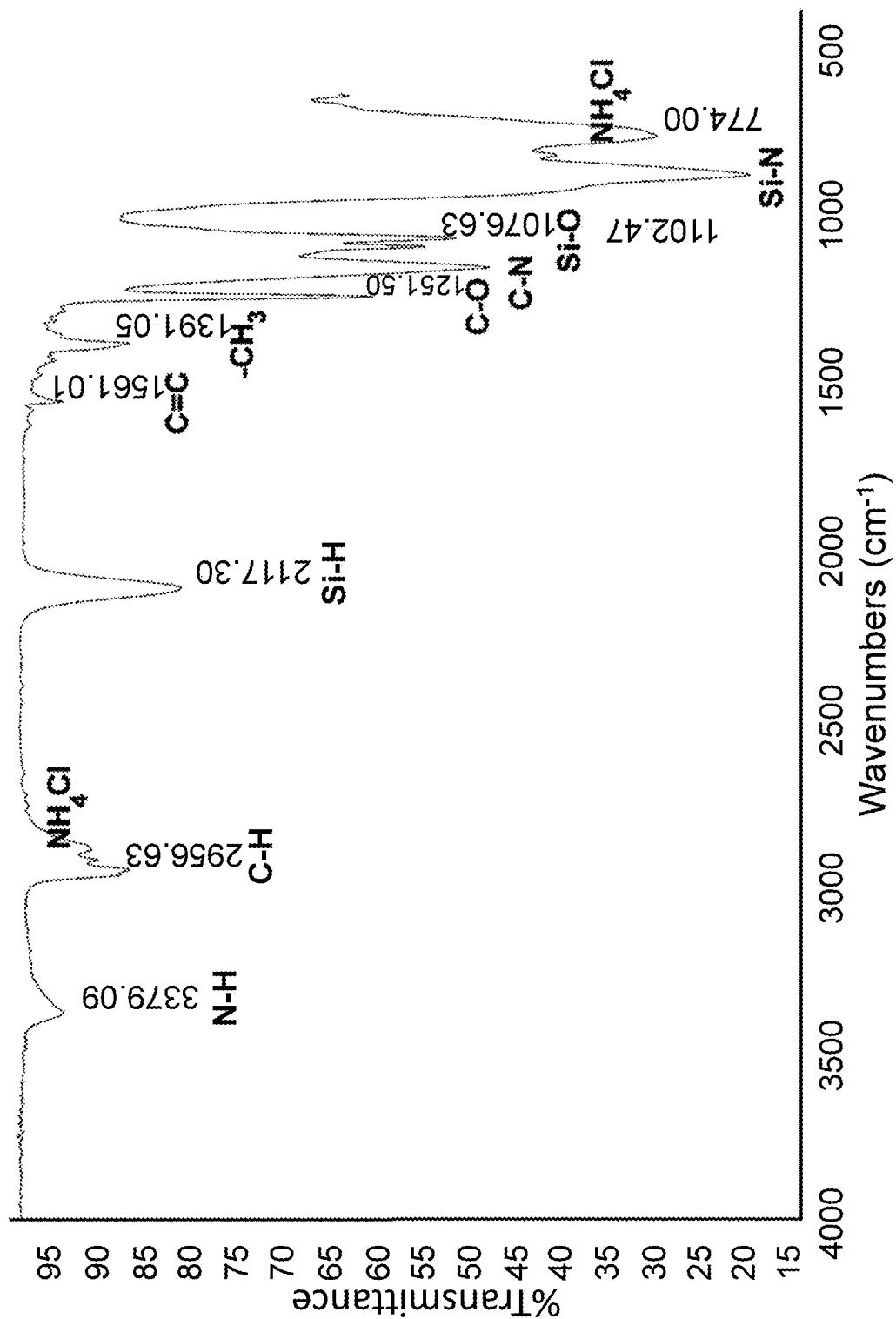
FIG. 7 depicts the FTIR spectrum of a HTA® 1500 coating sample.

FIG. 7 is an FTIR spectrum for HTA® 1500 Resin as manufactured by KiON. Samples were analyzed on a Nicholet 380 infrared spectrometer. Measurements were taken in ATR mode with a resolution of 4.000 cm−1 and as an average of 128 scans.

The FTIR spectrum for the HTA® 1500 Resin indicates aliphatic hydrocarbons at the bands from 2950 cm$^{-1}$ to 2800 cm$^{-1}$. The C=C stretch at 1550 cm$^{-1}$ at indicates partially polymerized vinyl groups, which possibly originated from ammonolysis of chlorosilanes during HTA® 1500 synthesis. Further, HTA® 1500 Resin contains free amine bonds (N—H), as indicated by the band 3380 cm$^{-1}$. All together, the HTA® 1500 Resin in the range of 3-5% ammonium chloride contamination, which was estimated in relation to the FTIR spectra for standard samples and according to the integrated peaks for the two FTIR bands corresponding to NH4Cl.

HTA® 1500 Resin also contains Si—H bonds, as indicated by the strong Si—H band at 2117 cm$^{-1}$. The Si—H bonds are required for network formation during curing. HTA® 1500 Resin further contains a mixture of Si—N and Si—O bonds, indicating that the polysilazane that originated from the ammonolysis of chloromethylvinylsilane (or a mixture of organochlorosilanes) has been processed with a silicone compound, such as cyclotetrasiloxane or tetramethylcyclotetrasiloxane. In addition, the ratio of the bands for —CH$_3$ (1391 cm$^{-1}$) and at (1101 cm$^{-1}$) indicates that dimethyl fluid is not a component used to make HTA® 1500 Resin.

In contrast, the C═C stretch at 1650 cm$^{-1}$ is absent in the spectra for DT coatings which used HTA® 1500 Resin as a constituent, namely DT-420 (FIG. 4), DT-405 (FIG. 5) and DT-201 (FIG. 6). (See also Example 9 above.) The reactions may involve vinyl groups in DT materials, accounting for a fraction of the observed loss of Si—H signal intensity when compared to that of the HTA® 1500 Resin. Such reactions involving vinyl groups have been observed previously only in the presence of the divinylplatinum catalysts. Therefore, the siloxane constituent, dimethyl silicone fluids (B-resin), in the DT coating composition may facilitate the reaction shown in Scheme 1 below:

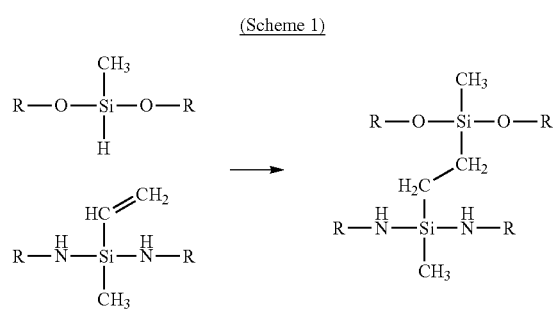

(Scheme 1)

Scheme 1 presents the addition of a silicon-hydrogen bond (Si—H) to a vinyl group of a neighboring chain.

Furthermore, the presence of C—N bands at 1150 cm$^{-1}$ in the DT-420, DT-405, and DT-201 coatings indicate that the addition of dimethyl silicone fluid enables a methyl exchange reaction, as shown in Scheme 2 below:

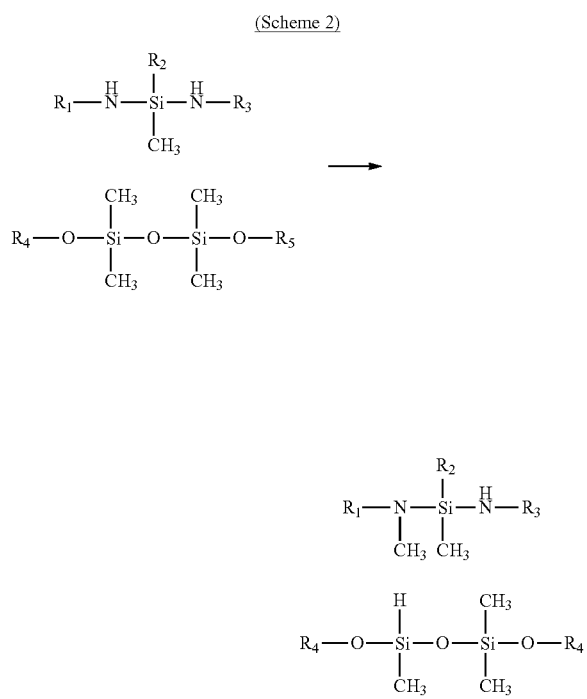

(Scheme 2)

Considering typical bond dissociation energies, the exchange of N—H (314 kJ/mol) and Si—CH$_3$ (435 kJ/mol) is thermodynamically favored over N—CH$_3$ (770 kJ/mol) and Si—H (298 kJ/mol), releasing a net of –319 kJ/mol of energy and thus promoting the crosslinking reactions within the polymer network of the coatings. At the same time, new Si—H functionalities are created, allowing for subsequent networking reactions.

Without wishing to be bound by theory, the coating compositions formulated in the present application cure faster than previously known coating compositions without requiring additional heat or a transitional metal catalyst, which is an advantageous property for silicon-based coatings. This increased rate of curing is supported by the thermodynamic calculation for the bond exchange. This enhanced crosslinking leads to the consumption of vinylic and silane functional groups within the coating, and leads to a substantially crosslinked polymer network of Si—O, Si—C, and Si—N bonds, especially where the Si—N and Si—C bonds are part of the same polymer network.

Example 11—Comparison of DT Coatings to Other Coatings Using Coefficient of Friction and Cutting Tests To determine the benefits of the DT coatings in the present invention in comparison to other finishes, the sample DT-420 coating was applied to Stanley HeavyDuty™ 15" saw blades or TK blades for various test, using the coating procedure described above in Example 6. The coefficient of friction (COF), initial sharpness, cutting ability using paper, cutting ability to asphalt shingle, and cutting ability to sheet rock tests were conducted to compare the DT-420 coating as provide in the present application to coatings such as, Teflon® and lacquer, which are currently used.

Coefficient of Friction. Table 8 provides the results of coefficient of friction test, under which the coating materials in comparison were applied to Stanley HeavyDuty 15" saw blades subjecting to 1 lb., 2.5 lb., 5 lb., and 10 lb. of pressure. Blades coated with a DT-420 coating preformed equivalently to the Teflon®-coated blade, both of which were about 70% slicker than the lacquered blades.

TABLE 8

Coefficient of Friction Test Results

| Sample | COF (1 lb. weight) | COF (2.5 lb. weight) | COF (5 lb. weight) | COF (10 lb. weight) |
|---|---|---|---|---|
| DT-420 | 0.2 | 0.4 | 0.8 | 1.6 |
| Teflon ™ | 0.2 | 0.4 | 0.8 | 1.6 |
| Lacquer | 0.25 | 0.6 | 1.2 | 2.1 |
| No finish | 0.25 | 0.55 | 1.1 | 2.0 |

Initial Sharpness. To test initial sharpness of the blades, the number of strokes needed to cut through a pinewood log was measured for each saw blade. The test was repeated for a total of ten runs. The first run was discarded from each sample set, and the average number of strokes was calculated for runs 2 through 10, as shown below in Table 9.

TABLE 9

Blade Initial Sharpness Test
Cuts on log (Clear Pine)

| Sample | Run #1 | Run #2 | Run #3 | Run #4 | Run #5 | Run #6 | Run #7 | Run #8 | Run #9 | Run #10 | Avg. Runs 2-10 |
|---|---|---|---|---|---|---|---|---|---|---|---|
| DT-420 | 53 | 45 | 44 | 48 | 51 | 51 | 50 | 48 | 48 | 36 | 46.8 |
| Teflon ® | 37 | 37 | 38 | 38 | 38 | 38 | 37 | 37 | 37 | 38 | 37.6 |
| Lacquer | 39 | 38 | 37 | 36 | 36 | 36 | 36 | 36 | 36 | 36 | 36.3 |
| No finish | 37 | 37 | 36 | 37 | 37 | 43 | 43 | 41 | 45 | 46 | 40.6 |

The DT-420 coated blades averaged more required strokes per cut than did lacquered blades. Therefore, blades having other coatings had better initial sharpness than DT-420 coated blades.

Cutting ability: CATAR STD test is a standardized test procedure to quickly and accurately produce sharpness data for quality control, product evaluation for blade or knife edge. CATAR STD test was used for further sharpness measurement of TK blades coated with the DT-6060 coating, Teflon®, and lacquer. TK blades coated with the DT-6060 coating were prepared following the procedure described above in Example 3. The 11-921-60 cut program on the New Britain Plant Catra Paper Cutting Machine was used to perform the testing.

TABLE 10

CATAR Paper Cutting Test Results:

| Sample | First Cut Depth | Total 60 Cut Depth |
|---|---|---|
| DT-6060 | 36.1 | 538.6 |
| DT-6060 | 43.5 | 534.3 |
| DT-6060 | 40.0 | 540.8 |
| No finish | 44.3 | 484.4 |
| No finish | 44.0 | 470.8 |
| No finish | 45.5 | 480.3 |

The first cut of the TK blades with no finish was approximately 10% better than that of TK blades covered with the DT-6060 coating. However, after the initial three cuts the DT-6060 coated TK blades cut approximately 26% better than uncoated blades.

Cutting ability test using asphalt shingle or sheetrock was conducted to TK blades to show whether the DT-6060 coating can improve the cutting ability of the blades. No significant difference was found between the uncoated and DT-6060 coated blades when the amount of material that adhered to the blade surface during and after 100 cuts was examined. After 10-100 cuts, the side of the blades covered with DT-6060 coating showed minimal amount of asphalt shingle or sheetrock material sticking to the blade, which indicated that the DT-6060 coating does not affect the cutting ability of a blade. They are non-sticky and thus can avoid contaminant adhesion the coated surface.

Cookware. In addition, various DT silicon-based coatings have passed many standard tests used by cookware manufacturers. For example, DT coatings have passed the 4% lye solution and the 24-hour soak test. DT coatings also passed the extreme exposure test at 800° F. for 1 hour, showing no delamination of the coating after subsequent cold water quenching. DT coatings passed 100 dishwasher cycles without loss of release properties. DT coatings also passed the 12 dry egg cook test, where an egg is cooked onto the dry coated surface for three minutes per side at 350° F., immediately washed, and repeated for a total of twelve cycles. The dry egg cook test displayed no loss of release properties after the repeated exposures were observed. DT coatings also passed 40 cycles of the Tabor abrasion test, where each cycle consisted of 2,500 2-inch long strokes preloaded with 10 pounds of pressure and an abrasive pad change between each cycle, for a total of 100,000 strokes per test.

Example 12—Differential Light Scattering Analysis

Polymerization was determined using differential light scattering (DLS) measurements. DLS can be used to determine particle/molecular size, size distribution, and relaxations in complex fluids, especially on the nanomeric and colloidial scales. Random fluctuations of motion in the sample are interpreted in terms of the autocorrelation function (ACF) with the assumption that the measured particles are spherical in shape.

To prepare samples, 5 mL silicon-based material was dissolved in 5 mL hexanes, to which 200 μL MC polymerization initiator was added. The samples were allowed to rest at room temperature for two hours, then the solutions was measured using a 90Plus Particle Size Analyzer (Brookhaven) with a relaxation time ($\tau$) of 5.00 s using a vertically polarized laser light of wavelength 680 nm at a scattering angle of 90°. The DLS measurements were made with the intensity correlation function measured at a temperature of 25° C. with a maximum number of 256-channels using a Brookhaven Digital Autocorrelator. Data from these analyses are shown in FIGS. 8-15.

Figure 8:
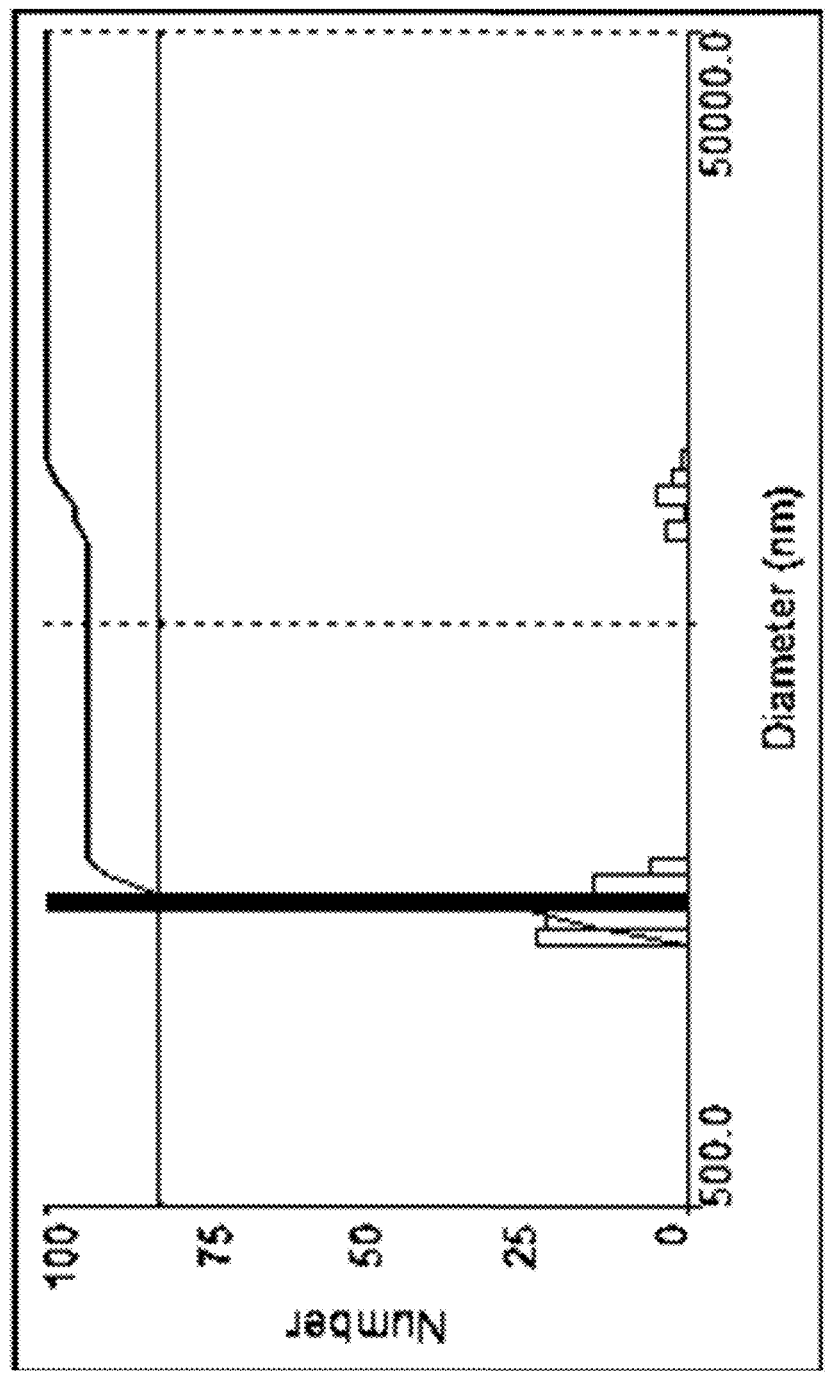
FIG. 8 shows the dynamic light scattering (DLS) histogram for the Si—N starting material.
Figure 9:
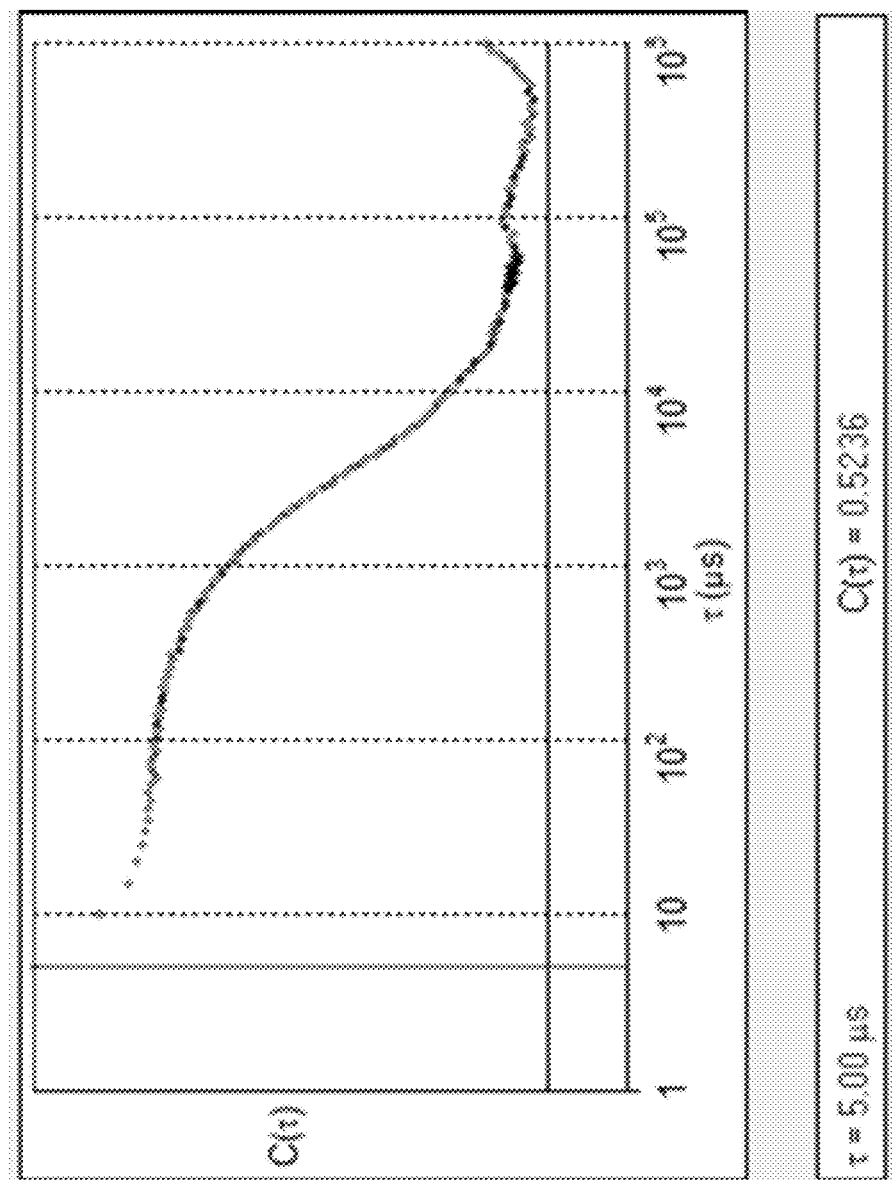
FIG. 9 shows the DLS correlogram for the Si—N starting material.
Figure 10:
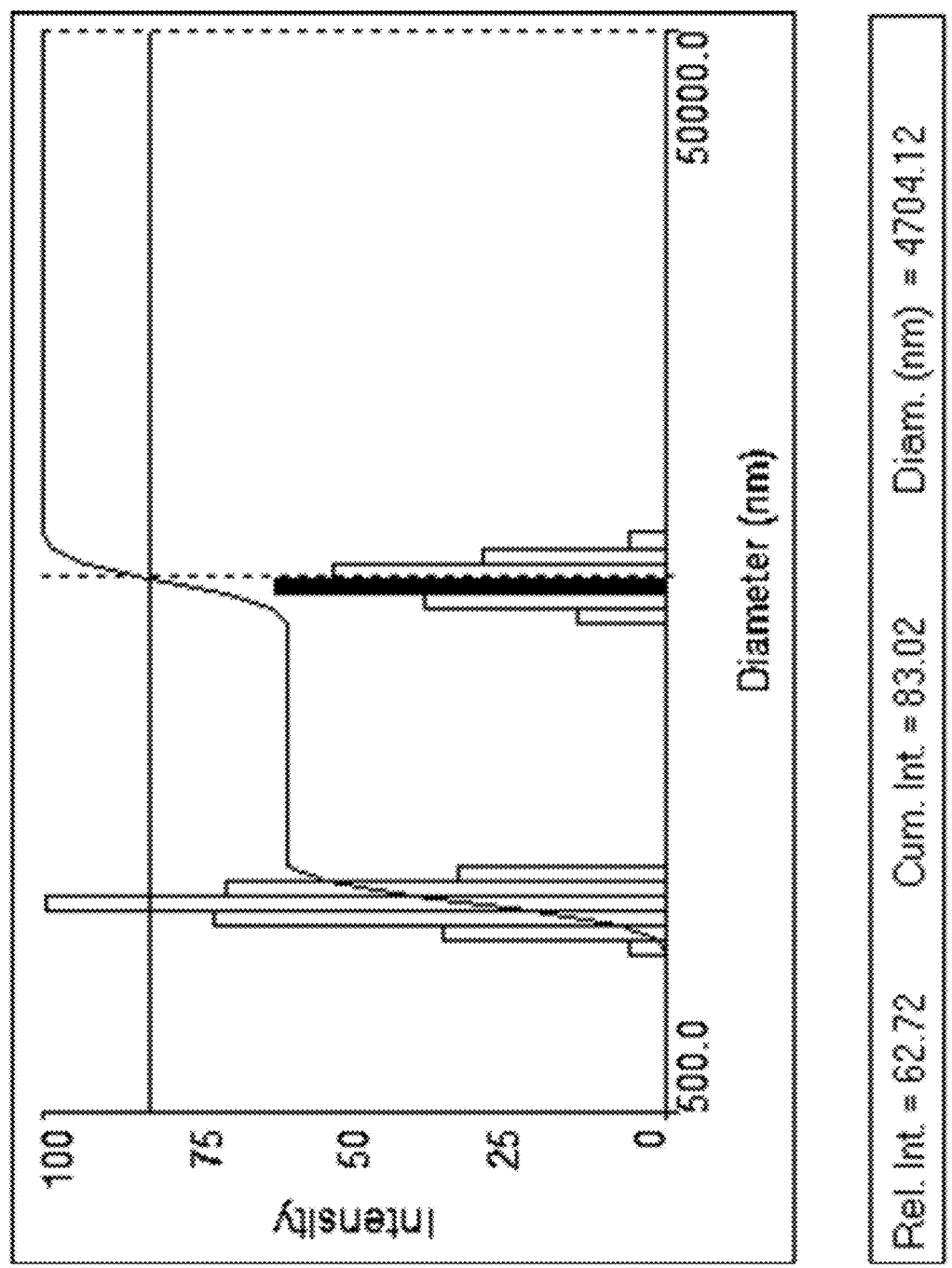
FIG. 10 shows the DLS histogram for Si—N-IS-300.
Figure 11:
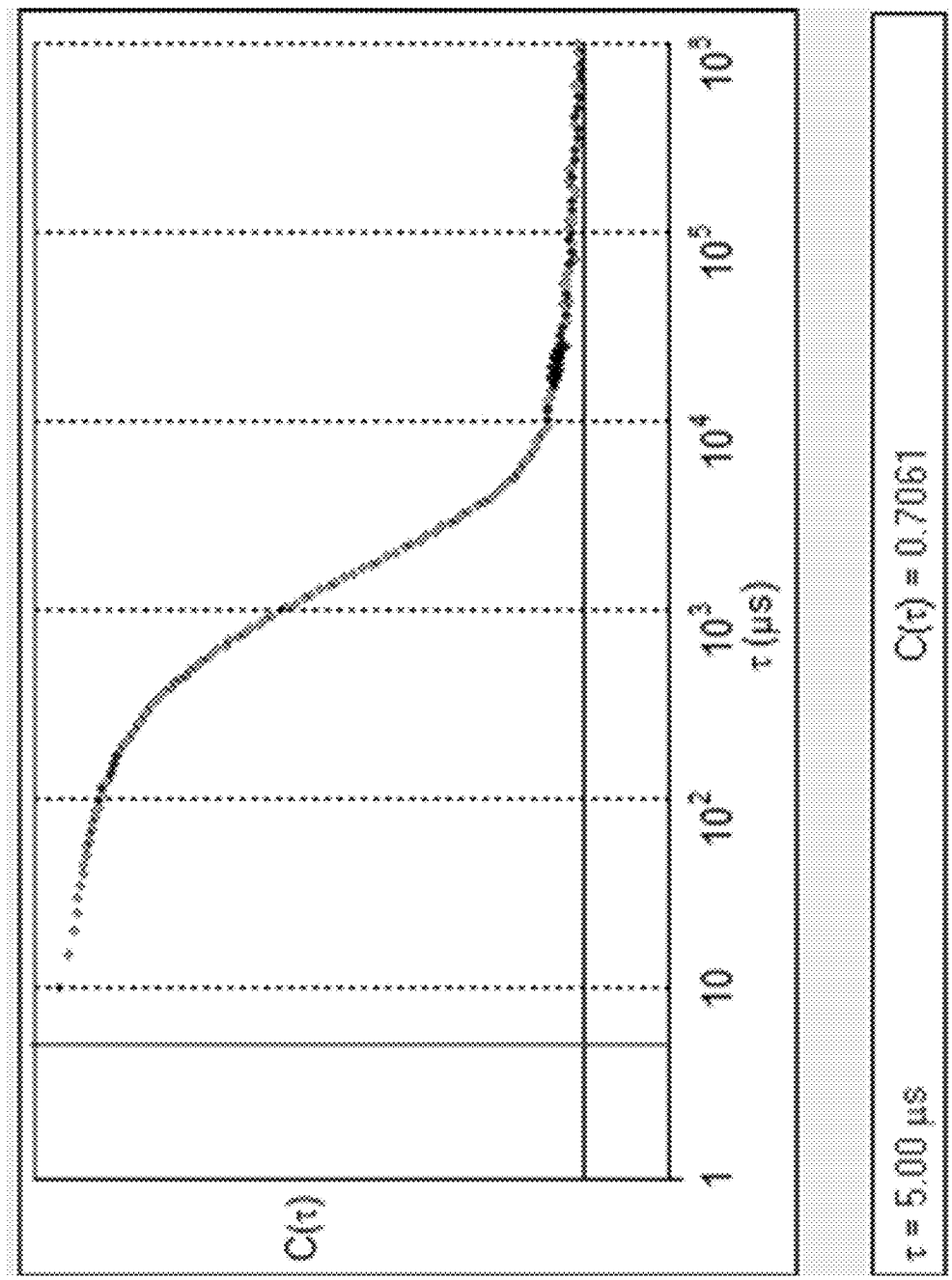
FIG. 11 shows the DLS correlogram for Si—N-IS-300.
Figure 12:
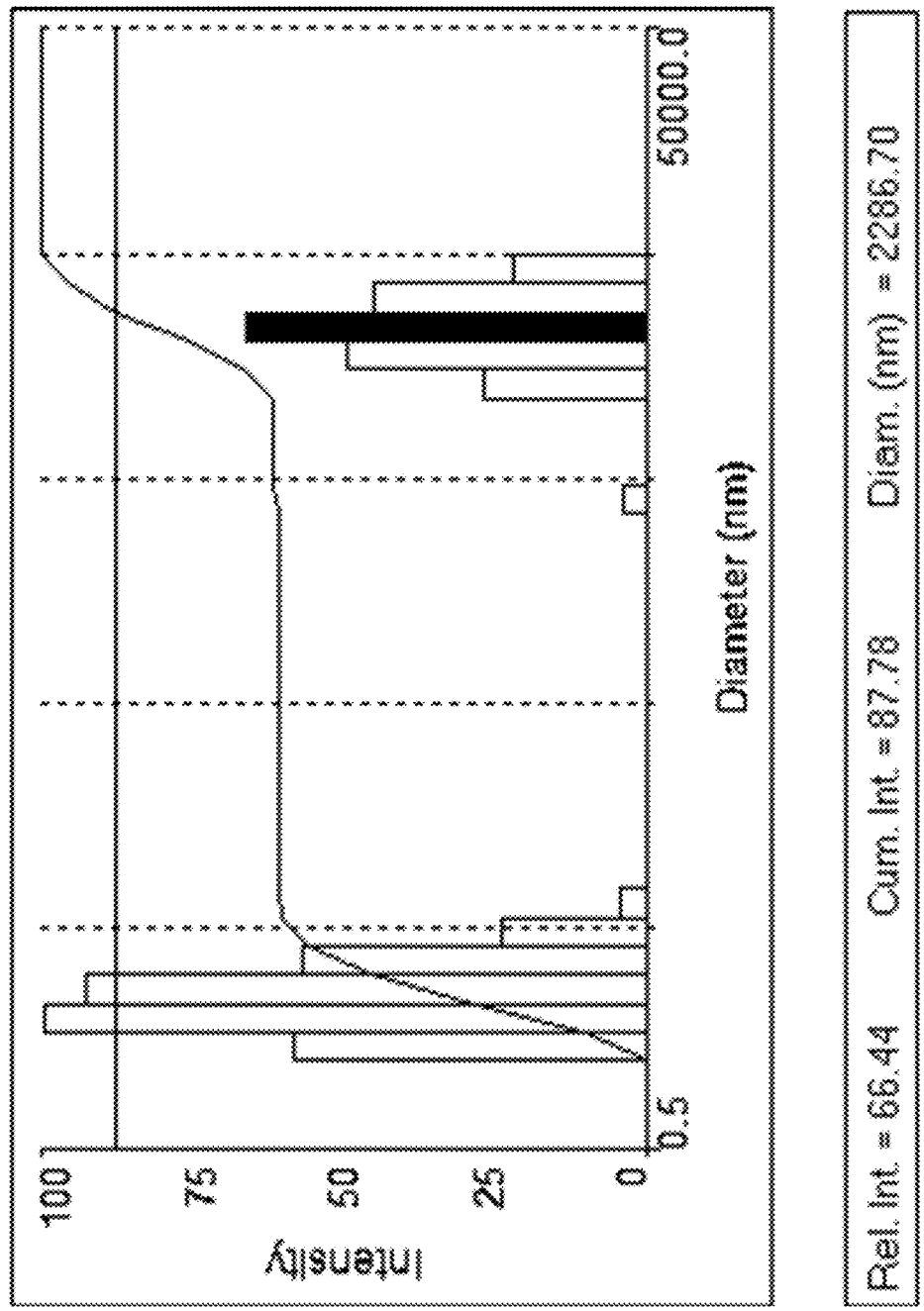
FIG. 12 shows the DLS histogram for Si—N-MC.
Figure 13:
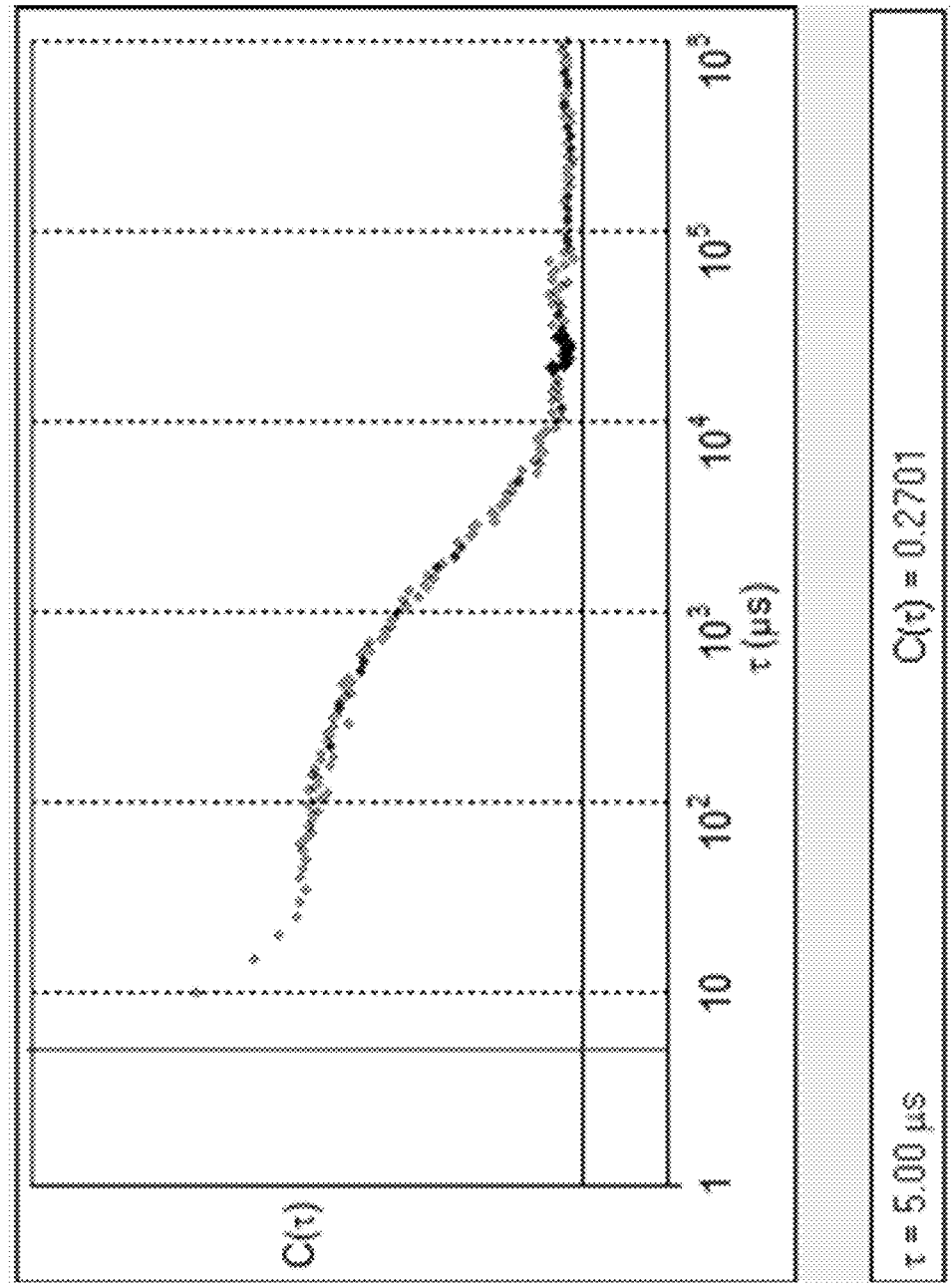
FIG. 13 shows the DLS correlogram for Si—N-MC
Figure 14:
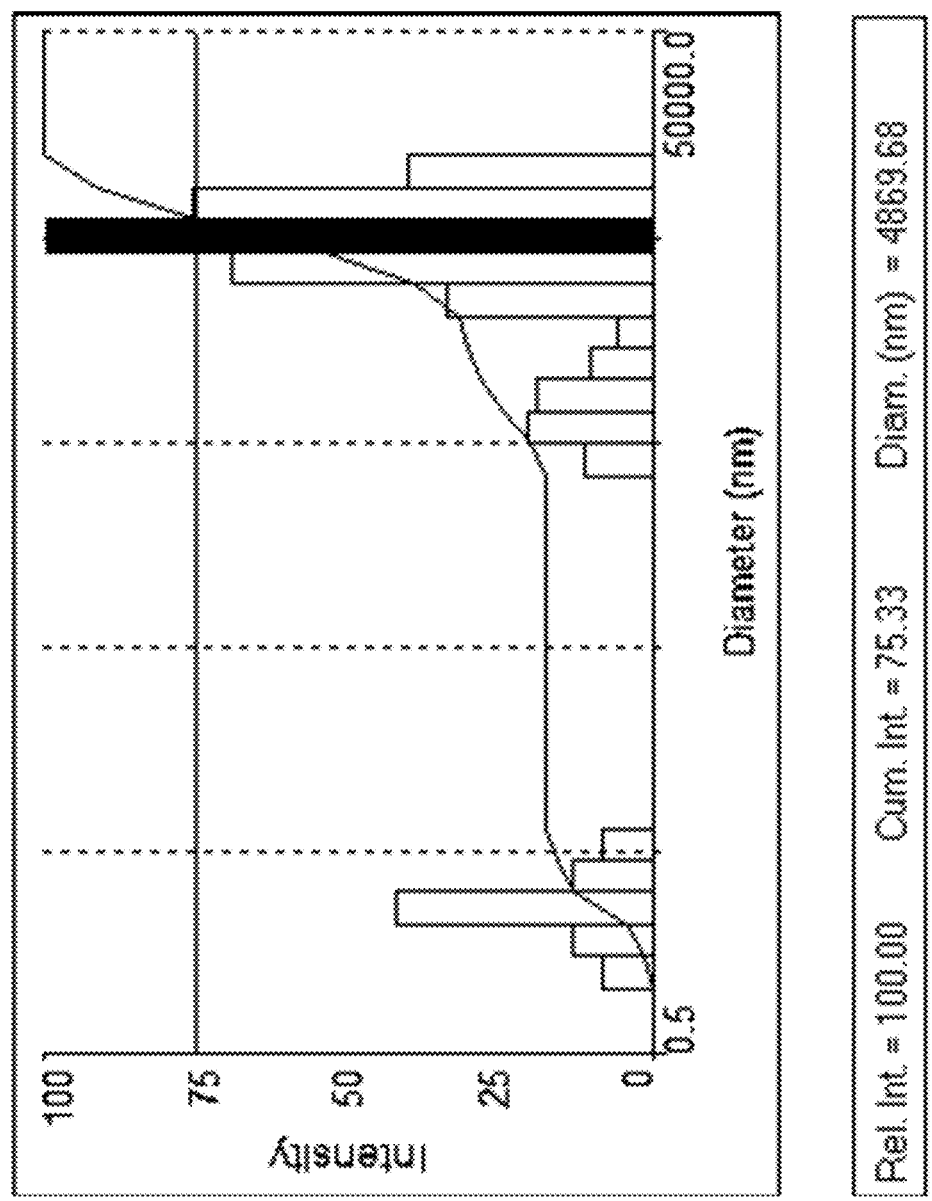
FIG. 14 shows the DLS histogram for Si—N-D68.
Figure 15:
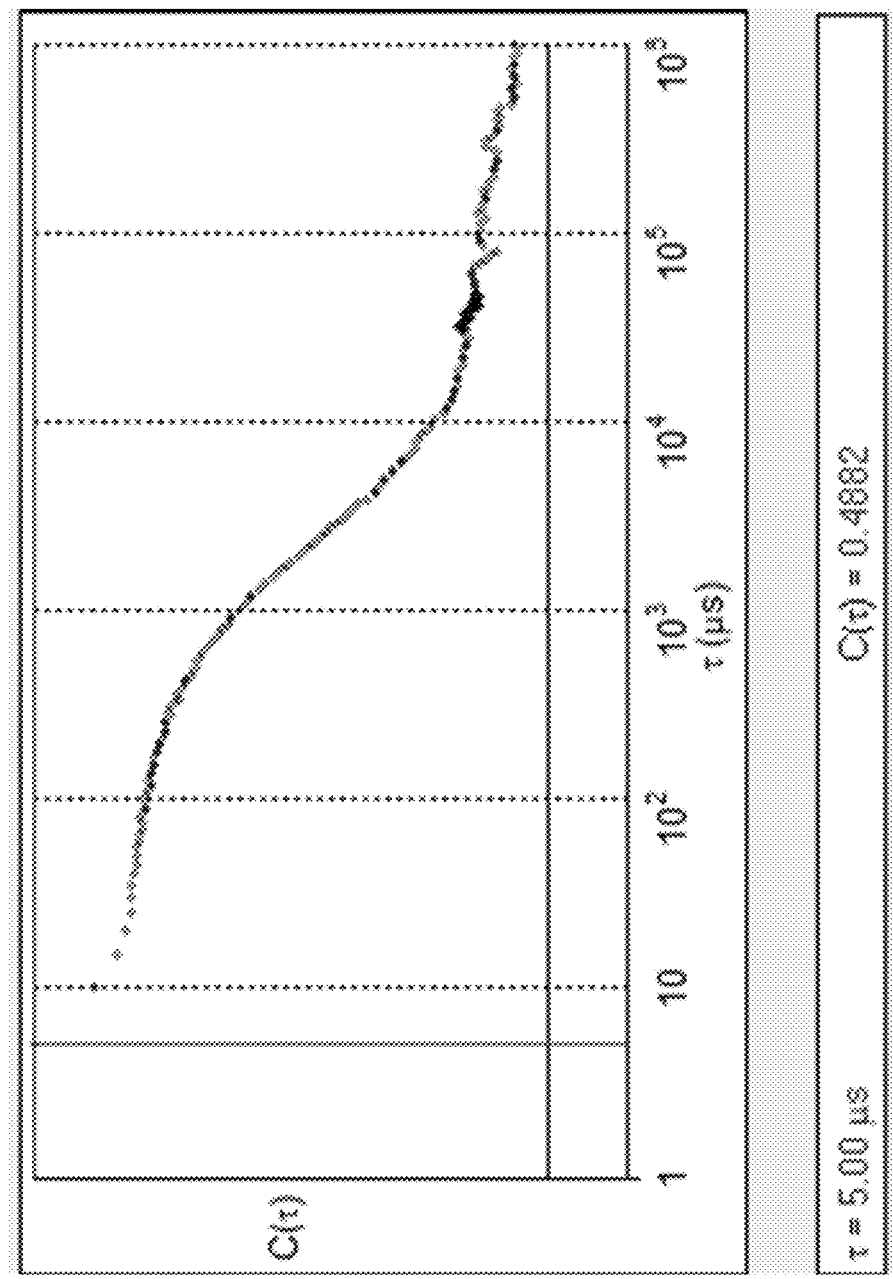
FIG. 15 shows the DLS correlogram for Si—N-D68.

The Si—N-starting material formed monodispersed particles with an average diameter of about 1650 nm (1.6 m) (FIGS. 8 & 9). The Si—N-IS-300 material formed particles with bimodal dispersions with averages at about 1500 nm (1.5 m) and at about 4700 nm (4.7 m) (FIGS. 10 & 11). The Si—N-MC-3 material formed particles with bimodal dispersions with averages at about 1 nm and at about 2300 nm (2.3 m) (FIGS. 12 & 13). The Si—N-D68-2 material formed particles with trimodal dispersions with averages at about 1 nm, at about 600 nm (0.6 m), and at about 4900 nm (4.9 m) (FIGS. 14 & 15). Of the samples analyzed, Si—N-IS-300 provided the most uniform particles (FIGS. 10 & 11), and Si—N-D68-2 provided the least uniform particles (FIGS. 14 & 15).

The performance of coating materials showing trimodal size distributions are preferred, because they can better adhere to surfaces and form stronger, more complete networks. In particular, the largest fraction forms the initial material framework and determines the physical properties directly after applying the material. The middle fraction is primarily responsible for forming new bonds during cross-linking, which strengthens the material and is primarily responsible for the curing process. The last fraction comprises low molecular weight components and is necessary to plug the holes in this network and to form the bonds with the surface necessary for adhesion.

While the present invention has been described with respect to preferred embodiments, it will be apparent to those skilled in the art that the disclosed invention may be modified in numerous ways and may assume many embodiments other than those specifically described above. Accordingly, it is intended by the appended claims to cover modifications of the invention that fall within the true spirit and scope of the invention.

What is claimed is:

1. A silicon-based coating composition comprising:
   1% to 4% (w/w of the total composition) cyclic polydimethylsilazane;
   1% to 9% (w/w of the total composition) polydimethylsilane of a formula $(R_1R_2Si)_n$, wherein n is greater than 1, and wherein $R_1$ and $R_2$ are each methyl;
   0.2% to 4% (w/w of the total composition) polydimethylsiloxane; and
   79% to 97% (w/w of the total composition) organic solvent chosen from isopropyl acetate, petroleum distillates, and combinations thereof.

2. A cured silicon-based coating, the coating formed from a mixture of constituents comprising:
   1% to 76% (w/w of the total composition) polysilazane;
   0.2% to 4% (w/w of the total composition) polysiloxane;
   1% to 9% (w/w of the total composition) polysilane of a formula $(R_1R_2Si)_n$, wherein n is greater than 1, and wherein $R_1$ and $R_2$ are the same or different and are chosen from alkyl, alkenyl, cycloalkyl, alkylamino, aryl, aralkyl, or alkylsilyl; and
   at least one organic solvent;
   wherein the coating is substantially free of Si-H bonds, and wherein the coating comprises a polymer network comprising Si—O bonds and Si—C bonds.

3. The cured silicon-based coating of claim 2, the coating formed from a mixture of constituents comprising:
   1% to 4% (w/w of the total composition) cyclic polydimethylsilazane;
   1% to 9% (w/w of the total composition) polydimethylsilane of a formula $(R_1R_2Si)_n$, wherein n is greater than 1, and wherein $R_1$ and $R_2$ are each methyl;
   0.2% to 4% (w/w of the total composition) polydimethylsiloxane; and
   79% to 97% (w/w of the total composition) organic solvent chosen from isopropyl acetate, petroleum distillates, and combinations thereof;
   wherein the coating is substantially free of Si-H bonds, and wherein the coating comprises a polymer network comprising Si—O bonds and Si—C bonds.

4. A silicon-based coating composition, comprising:
   1% to 76% (w/w of the total composition) polysilazane;
   1% to 9% (w/w of the total composition) polysilane of a formula $(R_1R_2Si)_n$, wherein n is greater than 1, and wherein $R_1$ and $R_2$ are the same or different and are chosen from alkyl, alkenyl, cycloalkyl, alkylamino, aryl, aralkyl, or alkylsilyl;
   0.2% to 4% (w/w of the total composition) polysiloxane; and
   at least one organic solvent.

5. The silicon-based coating composition of claim 4 further comprising 0.5% (w/w of the total composition) to 2.5% (w/w of the total composition) acetate ester.

6. The silicon-based coating composition of claim 4, wherein the polysilazane is cyclic polydimethylsilazane.

7. The silicon-based coating composition of claim 4, wherein the polysiloxane is polydimethylsiloxane.

8. The silicon-based coating composition of claim 4, wherein the polysilane is polydimethylsilane.

9. The silicon-based coating composition of claim 4, wherein the solvent is isopropyl acetate and petroleum distillates.

10. The silicon-based coating composition of claim 4 comprising:
    1% to 4% (w/w of the total composition) cyclic polydimethylsilazane;
    1% to 9% (w/w of the total composition) polydimethylsilane of a formula $(R_1R_2Si)_n$, wherein n is greater than 1, and wherein $R_1$ and $R_2$ are each methyl;
    0.2% to 4% (w/w of the total composition) polydimethylsiloxane; and
    79% to 97% (w/w of the total composition) organic solvent chosen from isopropyl acetate, petroleum distillates, and combinations thereof.

11. A cured silicon-based coating formed from a mixture of constituents comprising:
    1% to 76% (w/w of the total composition) polysilazane;
    0.2% to 4% (w/w of the total composition) polysiloxane;
    1% to 9% (w/w of the total composition) polysilane of a formula $(R_1R_2Si)_n$, wherein n is greater than 1, and wherein $R_1$ and $R_2$ are the same or different and are chosen from alkyl, alkenyl, cycloalkyl, alkylamino, aryl, aralkyl, or alkylsilyl; and
    at least one organic solvent;
    wherein the coating is substantially free of Si-H bonds, and wherein the coating comprises a polymer network comprising Si—O bonds and Si—C bonds.

12. The cured silicon-based coating of claim 11, the coating formed from a mixture of constituents comprising:
    1% to 4% (w/w of the total composition) cyclic polydimethylsilazane;
    1% to 9% (w/w of the total composition) polydimethylsilane of a formula $(R_1R_2Si)_n$, wherein n is greater than 1, and wherein $R_1$ and $R_2$ are each methyl;
    0.2% to 4% (w/w of the total composition) polydimethylsiloxane; and
    79% to 97% (w/w of the total composition) organic solvent chosen from isopropyl acetate, petroleum distillates, and combinations thereof;
    wherein the coating is substantially free of Si-H bonds, and wherein the coating comprises a polymer network comprising Si—O bonds and Si—C bonds.

* * * * *